(12) United States Patent
Rode et al.

(10) Patent No.: US 12,365,236 B2
(45) Date of Patent: Jul. 22, 2025

(54) VARIABLY OPENABLE FAIRING WITH COLLAPSIBLE PANELS

(71) Applicant: aeRO18, LLC, Bridgeton, MO (US)

(72) Inventors: Mark Rode, St. Charles, MO (US); Trung Q. Do, Kirkwood, MO (US)

(73) Assignee: aeRO18, LLC, Bridgeton, MO (US)

( * ) Notice: Subject to any disclaimer, the term of this patent is extended or adjusted under 35 U.S.C. 154(b) by 584 days.

(21) Appl. No.: 17/897,644

(22) Filed: Aug. 29, 2022

(65) Prior Publication Data

US 2023/0063315 A1 Mar. 2, 2023

Related U.S. Application Data

(60) Provisional application No. 63/239,188, filed on Aug. 31, 2021.

(51) Int. Cl.
*B60K 11/00* (2006.01)
*B60K 11/08* (2006.01)
*F28F 13/06* (2006.01)

(52) U.S. Cl.
CPC ............ *B60K 11/085* (2013.01); *F28F 13/06* (2013.01)

(58) Field of Classification Search
CPC ......... B60K 11/00; B60K 11/04; B60K 11/08; B60K 11/06; B60K 11/085; B60R 2021/343; B60R 21/38; B62D 35/001; B60Y 2200/14; B60Y 2200/145; B60Y 2200/148; F28F 13/06
USPC ........................................................ 180/68.1
See application file for complete search history.

(56) References Cited

U.S. PATENT DOCUMENTS

| | | | |
|---|---|---|---|
| 6,857,495 B2 * | 2/2005 | Sawa ...................... | B60R 21/36 296/193.11 |
| 7,997,375 B2 * | 8/2011 | Shaw ...................... | B60R 21/38 180/274 |
| 8,534,410 B2 * | 9/2013 | Nakaura .................. | E05B 77/08 180/274 |
| 8,807,630 B2 * | 8/2014 | Rode ....................... | F01P 11/10 296/180.2 |
| 8,997,907 B2 | 4/2015 | Rode | |
| 9,399,443 B2 * | 7/2016 | Jayasuriya .............. | B60R 21/34 |

(Continued)

FOREIGN PATENT DOCUMENTS

WO WO2009072450 6/2009

*Primary Examiner* — James A Shriver, II
*Assistant Examiner* — Hilary L Johns
(74) *Attorney, Agent, or Firm* — Linda L. Lewis

(57) ABSTRACT

A fairing assembly 10 installed about a heat exchanger, such as a radiator R, to reduce the drag on the vehicle, comprising: a frame installed about the heat exchanger, the frame having a curved contour; a panel mounted in the frame, the panel and fairing assembly defining an air passage for air flow to the heat exchanger; a cover installed in the frame and movable to control air flow through the passage to the heat exchanger; and, moving means for moving the cover over the frame to expose a portion of the opening and allow air to flow into the heat exchanger, the frame and cover thereby reducing the amount of drag on the vehicle while still allowing air flow into the heat exchanger; wherein the panel comprises a first overlapping part and a second overlapping part; and wherein the first overlapping part is moveable from an extended position to a retracted position when the fairing is impacted.

20 Claims, 28 Drawing Sheets

(56) References Cited

U.S. PATENT DOCUMENTS

| | | |
|---|---|---|
| 10,723,218 B2 * | 7/2020 | Mitidieri ................. B60K 11/04 |
| 12,011,967 B2 * | 6/2024 | Garnier .................. B60K 11/06 |
| 2019/0315224 A1 * | 10/2019 | Mitidieri ................. F28F 27/02 |
| 2022/0041034 A1 * | 2/2022 | Garnier ................. B60K 11/085 |
| 2023/0358487 A1 * | 11/2023 | Toubiana ................ F28F 13/06 |

* cited by examiner

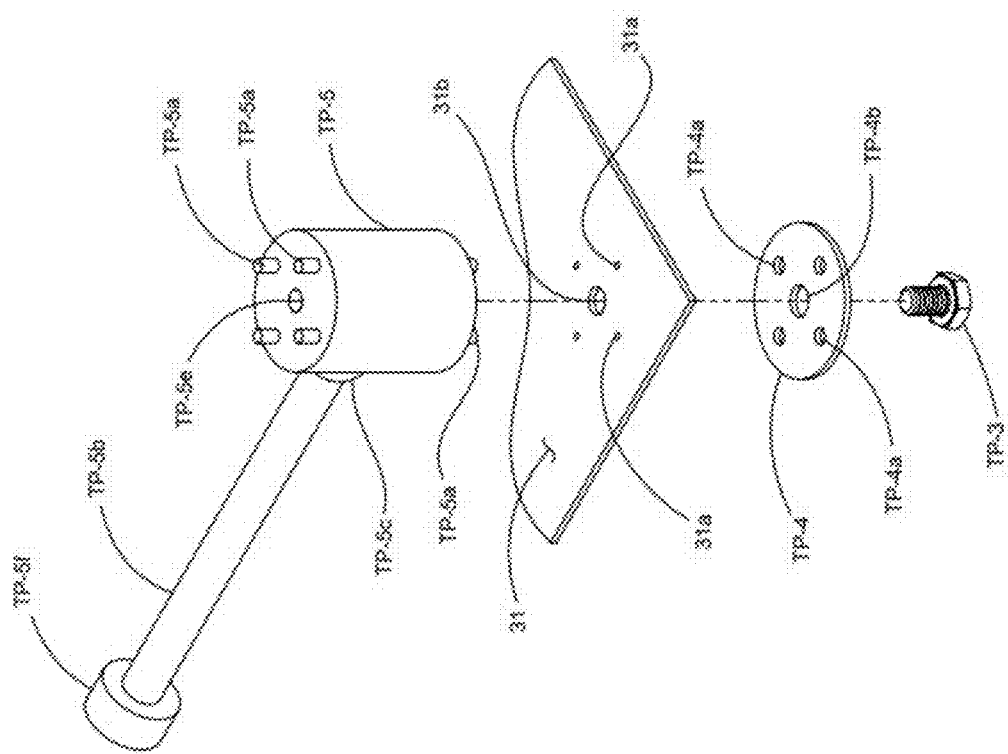

VARIABLY OPENABLE FAIRING WITH COLLAPSIBLE PANELS

CROSS-REFERENCE TO RELATED APPLICATIONS

This application claims the benefit of Provisional Patent Application 63/239,188 filed Aug. 31, 2021, which is hereby incorporated by reference.

STATEMENT REGARDING FEDERALLY SPONSORED RESEARCH

Not Applicable.

APPENDIX

Not Applicable.

BACKGROUND OF THE INVENTION

Field of the Invention

The present invention relates to a fairing assembly installed about a heat exchanger of a vehicle to promote efficient air flow over and about the front of the vehicle and reduce the drag on the vehicle. The assembly uses collapsible panels to direct the air flow to the heat exchanger. This reduces the likelihood of injury to a pedestrian impacted by the vehicle by absorbing some of the energy from the impact rather than the pedestrian absorbing all the energy.

Related Art

Inventions relating to vehicles are embodied in U.S. Pat. No. 8,807,630 patent entitled, Variably Openable Radiator Fairing, Shroud, or Fairing for Over the Road Vehicles and the Like, and its CIP, US U.S. Pat. No. 8,997,907, both herein incorporated by reference, which disclose fairings for cars and trucks which fit around a radiator and are designed to reduce drag when the vehicle is moving.

This is an active aerodynamic design, and other active aerodynamics features exist on cars with moving air dams, spoilers, door handles, wheel covers, suspension systems that lower the vehicle and active grille shutter systems to name a few. In 2012 European pedestrian standards forced auto manufacturers to make the front end of cars tall and blunt, which provides poor aerodynamics. The present invention solves both the poor aerodynamics and meets the required European pedestrian safety standards.

Regarding the European pedestrian standard, there have been other inventions relating to vehicles that address the problem of a forward moving vehicle impacting a pedestrian. It is desirable to reduce the damage done to a pedestrian when impacted by a vehicle. Bumpers, hoods and windshields have been redesigned to be "softer," meaning they can absorb energy without negatively affecting the structural integrity of the car. Instead of sending a pedestrian flying into the air, the front of a car will collapse, absorbing the brunt of the impact. To minimize head and lower-limb trauma, the most common injuries in a pedestrian accident, some vehicles even have foam and plastic "bonnets" that will deploy when a collision with a pedestrian is sensed. The structural integrity of the vehicle is maintained during impact.

The present invention is an improvement on the previous inventions, in that patented fairings that provide reduced drag are improved to also be collapsible in a low speed impact with a pedestrian and minimize the harm to the pedestrian. The impacted pedestrian does not impact the hood to be thrown up and through the windshield. In a preferred embodiment, the design is such that after collapse, the fairing is not damaged, and can return back to its original shape to be re-used.

Further, the present invention is suitable for vehicles that do not have a combustion engine, but are battery driven, such as electric cars, or hybrid engines.

SUMMARY OF THE INVENTION

The fairing assembly of the present invention is installed about a heat exchanger, such as radiator of a fossil fuel powered engine in a vehicle or a heat exchanger on an electric car, to promote efficient air flow over and about the front of the vehicle and reduce the drag on the vehicle. The assembly comprises a frame installed about the radiator or heat exchanger and defining an opening through which air flows into the radiator or heat exchanger. The frame, having a curved contour, allows air to flow smoothly about the frame. A panel mounted in the frame and extending across the front of the radiator or heat exchanger and fairing assembly define an air passage for air flow to the radiator. A cover installed in the frame and movable over the front of the radiator controls air flow through the air passage to the radiator. Moving means move the cover over the frame to open and allow air to flow into the radiator, or to close the opening and stop the air flow into the radiator. The frame and cover produce a smoother flow of air over and about the front of the vehicle thereby reducing the amount of drag on the vehicle while still allowing air flow into the radiator. The panel comprises at least one first overlapping part and at least one second overlapping part and the at least one first overlapping part is moveable from an extended position to a retracted position proximate the second overlapping part when the fairing is impacted. The at least one second overlapping part is in a fixed position.

In a preferred embodiment, the first overlapping part is moveably attached to the second overlapping part by a spring-loaded mechanism. In the relaxed state, the spring mechanism holds the first overlapping part in an extended position in front of and adjacent to the second overlapping part. In an impact, tension is applied to the spring mechanism by the force of the impact, causing the first overlapping part to move to a retracted position parallel to the second overlapping part. Preferably, when the force is removed, the first overlapping part moves back to the extended position.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 8E is an isometric exploded view showing trunnion TP-5 being attached to a lower overlapping part 31 at one corner, while drawing shows four locating holes, we can have more or less locating holes depending on the load against the overlapping parts 31 and 33.

DETAILED DESCRIPTION OF THE PREFERRED EMBODIMENTS

The following description of the preferred embodiment(s) is merely exemplary in nature and is in no way intended to limit the invention, its application, or uses.

Because of the size and shape of a vehicle K, the flow of air over and about the vehicle as it moves, creates a drag force which reduces the vehicle's fuel efficiency. A radiator or a heat exchanger R, is installed on the front of the vehicle, under its hood H and behind its front bumper B, is part of the vehicle structure that creates significant drag. Heat exchanger or radiator R typically presents a generally flat rectangular shaped surface against which the air buffets, increasing drag.

Figure 1:
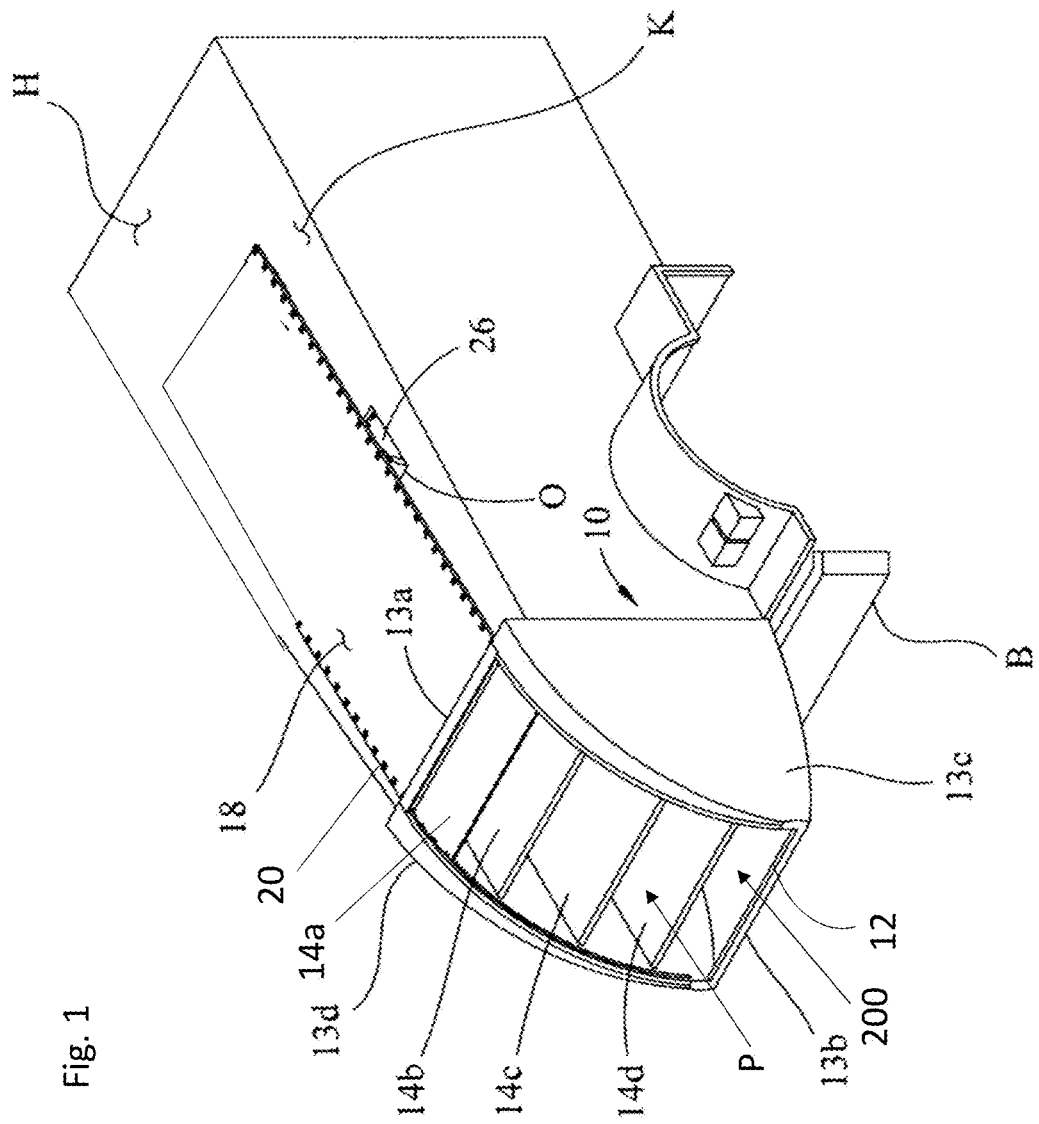
FIG. 1 is a raised front perspective of the invention having the cover in the open position.
Figure 2:
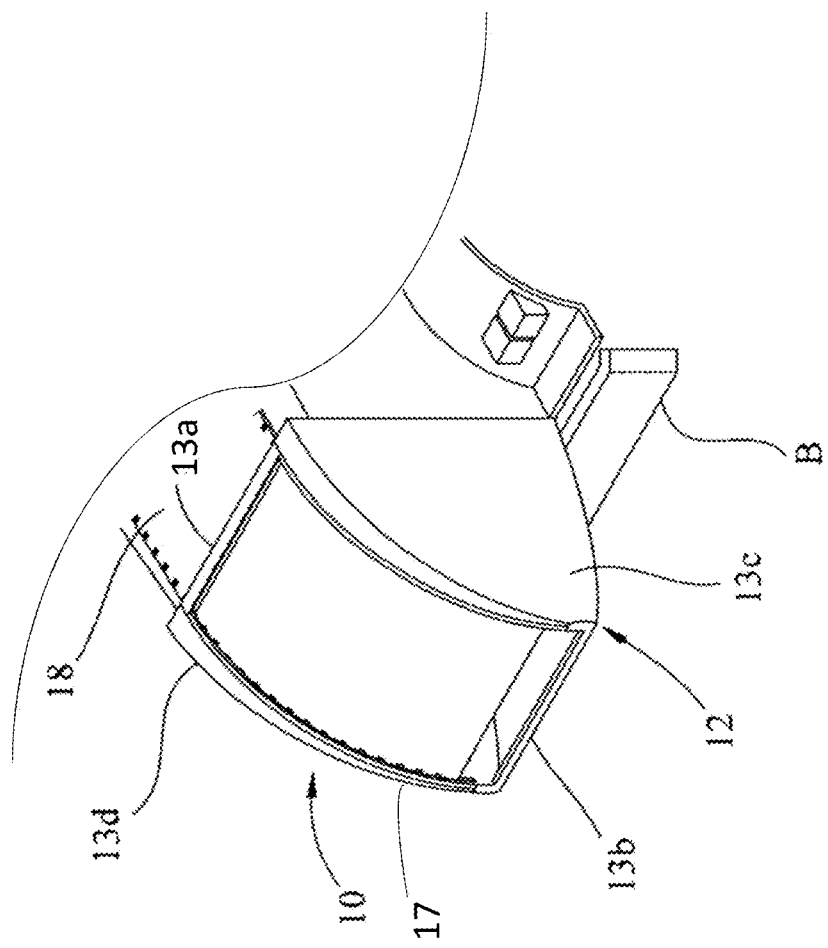
FIG. 2 is a raised front perspective of the invention having the cover in the closed position.
Figure 3:
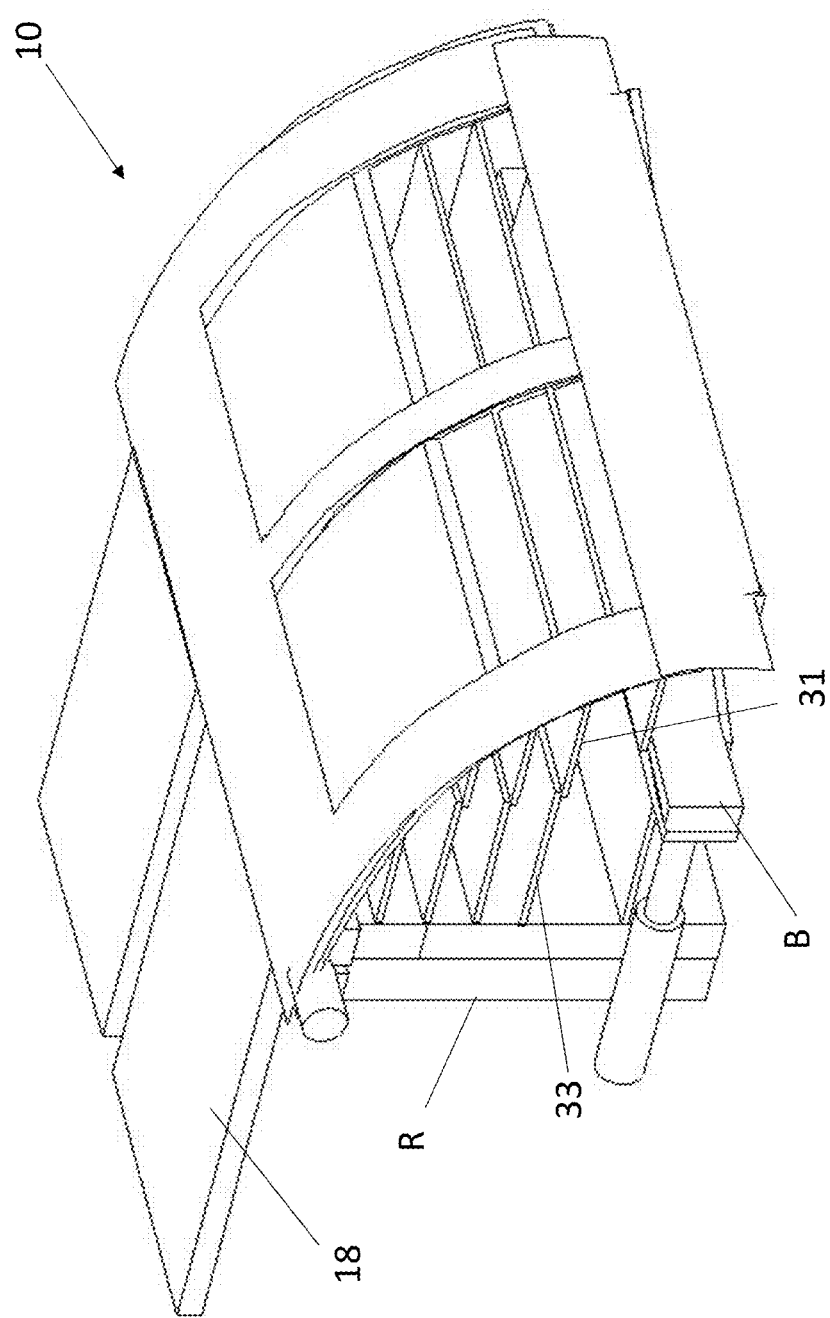
FIG. 3 is a raised front perspective of the invention showing the overlapping parts in the extended position and the cover partially closed.
Figure 4:
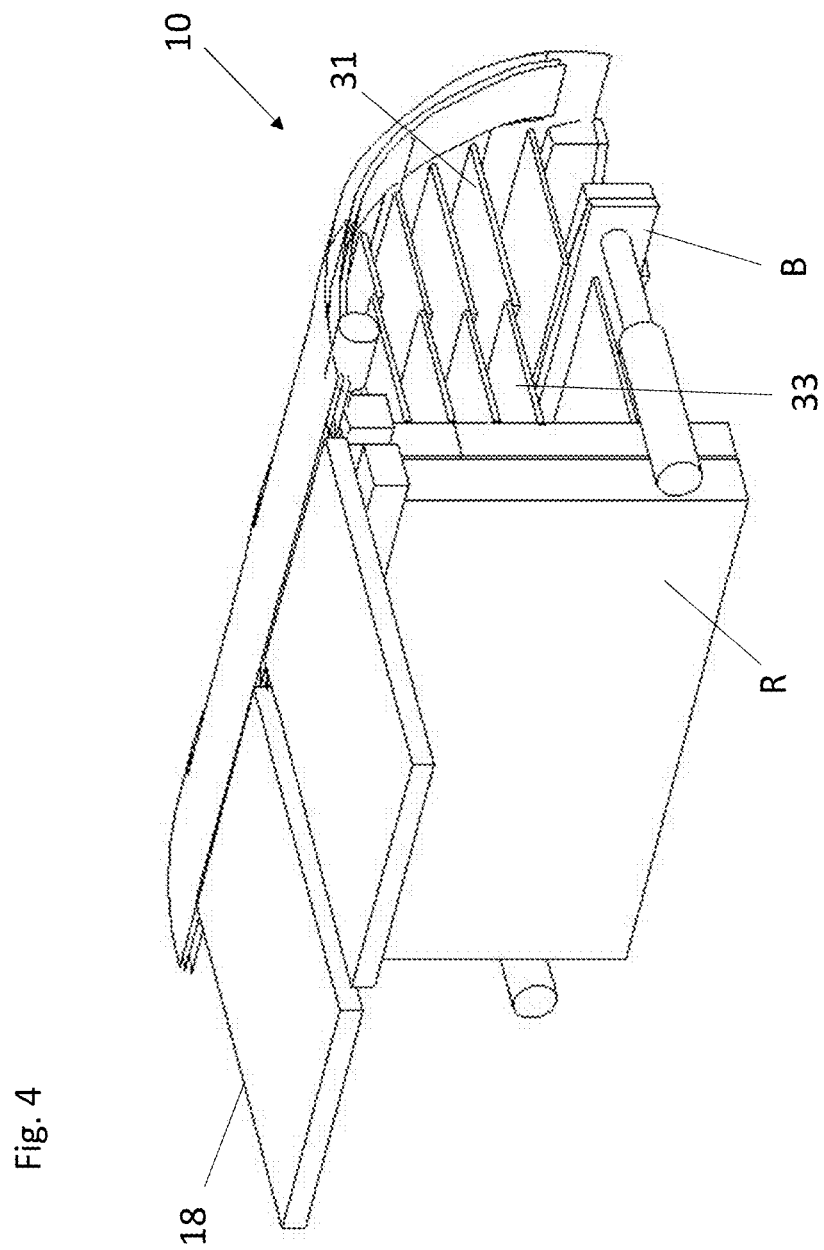
FIG. 4 is a raised rear perspective of the invention showing the overlapping parts in the extended positon.

Referring to FIGS. 1-4 fairing assembly 10 is shown in relation to the front end of vehicle K, hood H, and heat exchanger or radiator R. As shown in the drawings, the fairing assembly is attached or mounted to the front of the hood so that frame 12 of the assembly covers radiator R. A cover 18, is movable by a moving means 26, preferably a driving mechanism, over the front of the radiator to block or unblock the air flow passages P defined by the panels 14$a$-14$d$ and frame 12. The track 20 is used by the moving means 26 to move the cover. This is as shown in FIG. 2 in which cover 18 is moved to the closed position to substantially block all air flow to the radiator while reducing drag on the vehicle K. FIG. 1 illustrates the operating condition in which cover 18 is in the open position and substantially withdrawn from the front of assembly 10 for the passages P to allow significant air flow to the radiator. A curved track 17 is formed on the inner wall of each vertical side segment 13$c$, 13$d$ to capture the outer margin of the cover or sheet and guide its movement back and forth. No guide track 17 is required if cover 18 has a slightly curved contour and is relatively rigid in construction.

Referring to FIGS. 1-6, the present invention's fairing assembly 10 is attached or retro-fitted to the hood of the vehicle. The fairing 10 first includes a frame 12 which fits proximate the heat exchanger. Frame 12 is preferably of a molded lightweight yet robust plastic and single piece construction; although, it can be made of a lightweight metal or multiple pieces. As shown in FIGS. 1 to 4, the frame comprises upper and lower horizontal segments 13$a$ and 13b, and vertical side segments 13c and 13d. When installed, frame 12 defines an opening 200 through which air can flow into the heat exchanger. Mounted in frame 12 is at least one overlapping panel 14a-14d which are made of a plastic or lightweight metal. It will be understood that there could be more or fewer overlapping panels than are shown throughout the drawings. In a preferred embodiment, the overlapping parts are inserted in frame 12 through guide tracks TP-8 which are formed in the interior walls of vertical side sections 13c, 13d. The overlapping parts define air flow passages or air tunnels P for air directed through fairing assembly 10 to radiator R.

In an embodiment of the invention, the upper and lower horizontal segments 13a and 13b, and the vertical side segments 13c and 13d can also be overlapping parts that can move from an extended position to a retracted position.

In an embodiment of the invention, as shown in FIG. 1, while each panel is of the same width, the depth of the panels varies. That is panel 14a is the narrowest in depth and panel 14d the greatest. Panels 14b and 14c have widths intermediate those of these other two panels.

Each overlapping part is generally rectangular in shape and sufficiently sturdy that its shape is not distorted when the vehicle is moving at highway speeds. The sides or tips of the panels are sufficiently rigid that they do not bow or flex out of the tracks in which they are installed. Each overlapping part may also have a rigid outer tip installed on it to prevent flexure.

As shown in FIGS. 3-6, the panel of the present invention has a first overlapping part 31 and a second overlapping part 33. The first overlapping part is moveable from an extended position 41 to a retracted position 43 proximate to the second overlapping part. In a preferred embodiment, the first overlapping part moves proximate and parallel to the second overlapping part. In a more preferred embodiment the first overlapping part and the second overlapping part are approximately the same size and shape, and overlap in a parallel manner. In another preferred embodiment, the overlapping part can be returned to an extended position without being damaged, thereby being reusable. The overlapping parts may be more than two parts, such as three, four or more overlapping parts that move in a parallel manner, providing a stacked retracted position. Preferably, the moveable overlapping parts are from 1 to 10 parts. More preferably, the moveable overlapping parts are from 1 to 5 parts. The parts are designed to be stiff enough that air pressure from the moving vehicle will not cause them to retract. However, the force of the impact with a pedestrian will cause them to move from an extended position to a retracted position, reducing the damage of the impact to the pedestrian.

Figure 5:
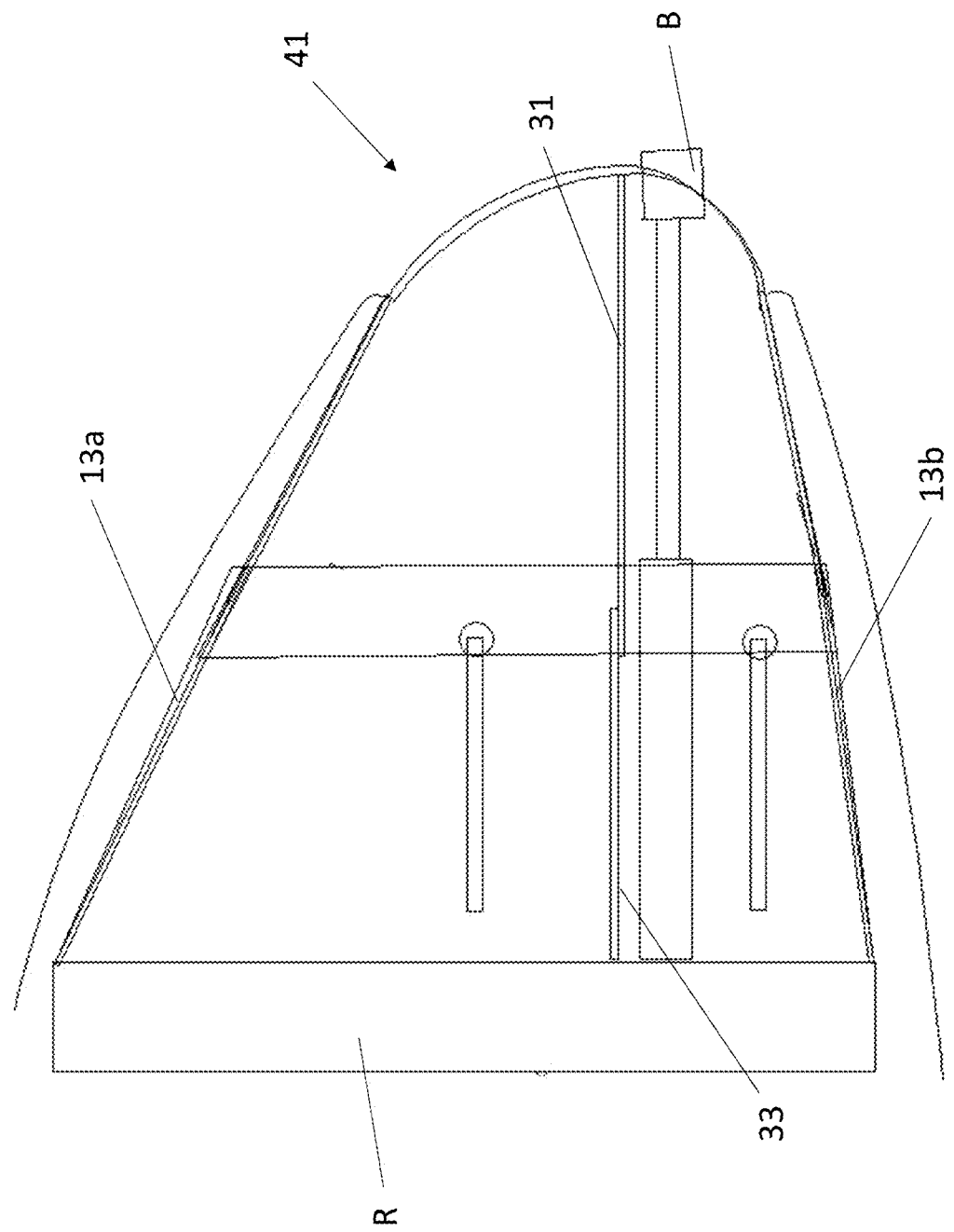
FIG. 5 is a side cutaway perspective of the invention showing the overlapping parts in the extended position.
Figure 6:
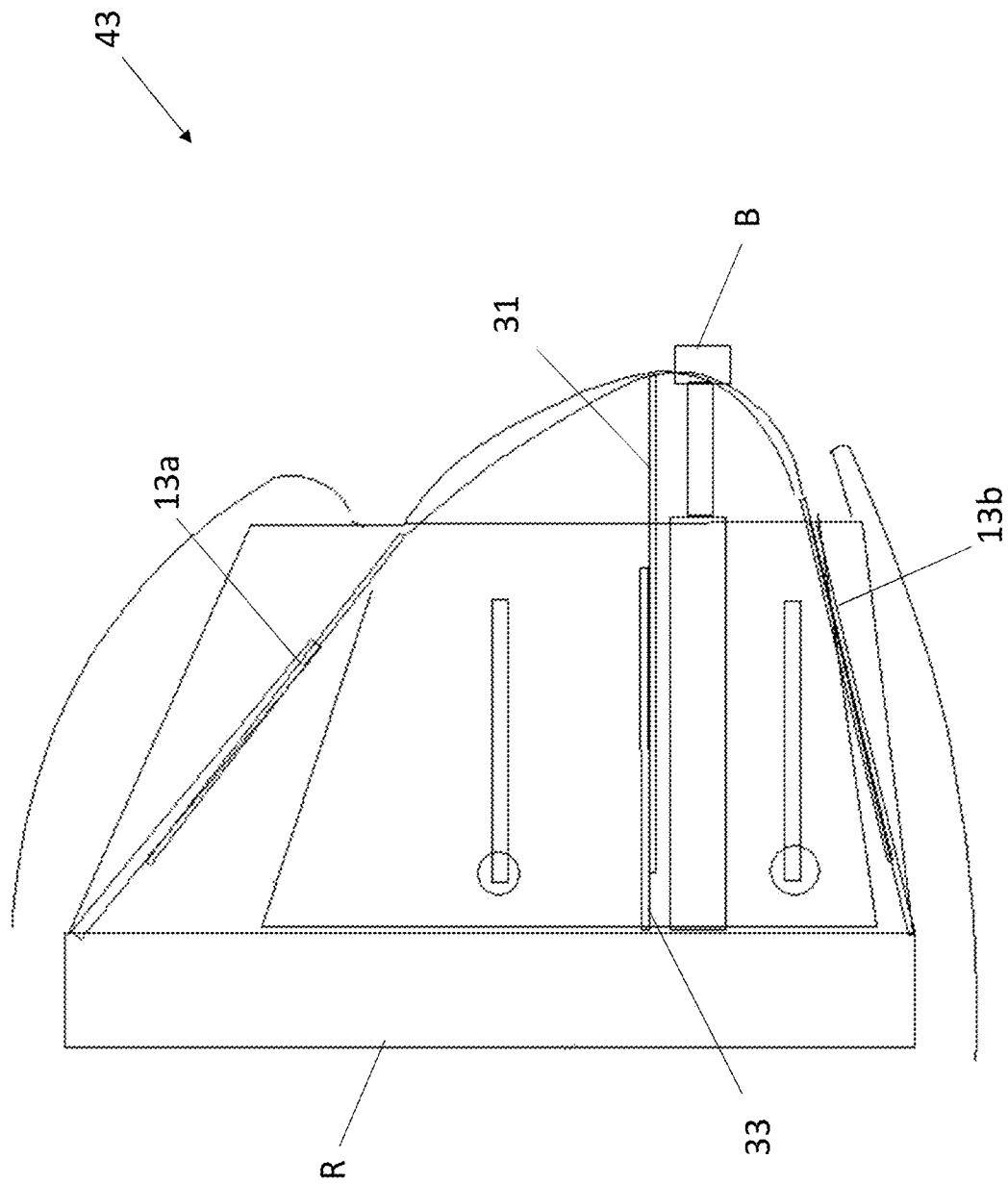
FIG. 6 is a side cutaway perspective of the invention showing the overlapping parts in the retracted position.

As shown in FIGS. 5 and 6, the horizontal segments 13a and 13b can be overlapping parts that move from an extended position to a retracted position. Not shown are segments 13c and 13d, which also can be overlapping. In another embodiment, the horizontal segments 13a and 13b, and the vertical side segments 13c and 13d can be made of a rigid, yet collapsible material such as rigid polyurethane foam or Styrofoam, or a combination of rigid material with rigid foam material. In the retracted position after impact, the foam has collapsed and shortened. The bumper B of the present invention may also be designed to retract upon impact.

In a preferred embodiment, at least some of the first overlapping parts and the second overlapping parts are attached by spring-loaded devices, where in the extended position, the springs are in the relaxed, untensioned state. When force is applied to the first overlapping parts, the springs are tensioned and the overlapping parts move to the tensioned retracted position. When the force is removed the overlapping parts move back to the extended position as the springs move to the untensioned state. The spring-loaded devices include scissor shocks, V-springs, coil springs, torsion springs, helical springs, etc. Springs are elastic objects that store mechanical energy, and are well-known in the art. Preferably, the springs used would be simple and light weight.

Figure 7:
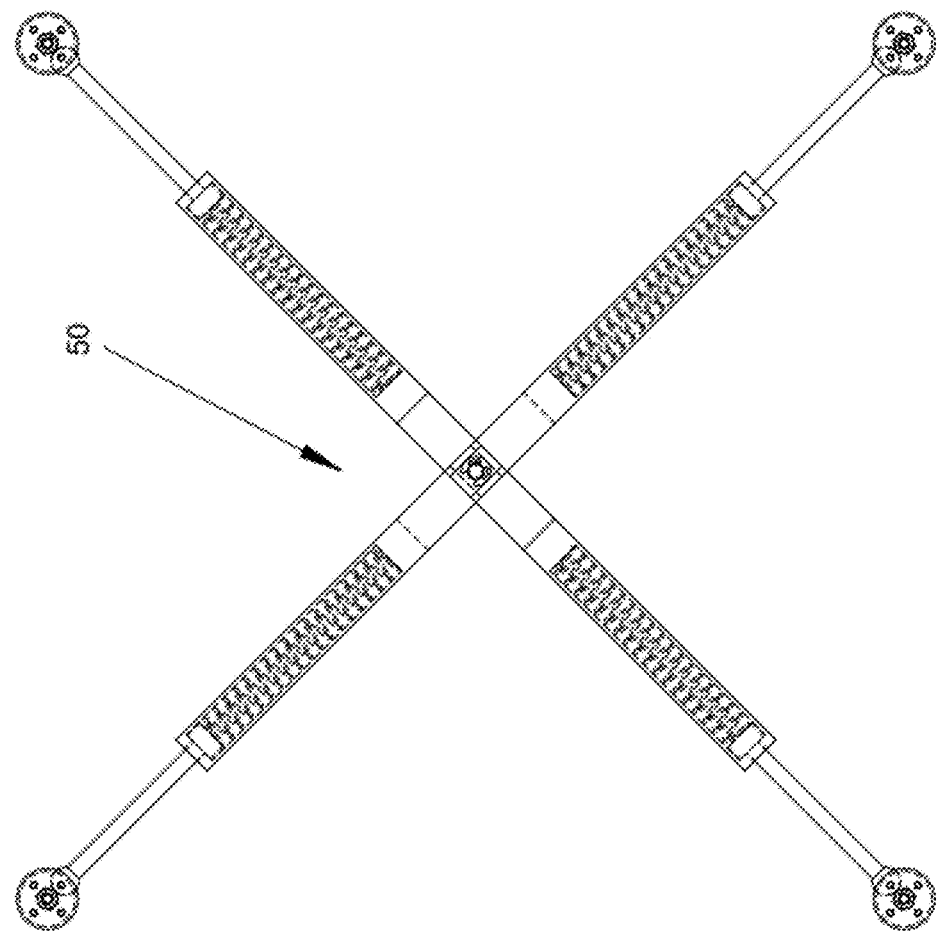
FIG. 7 is a top view of the crossed shock absorbers in the extended position.
Figure 8:
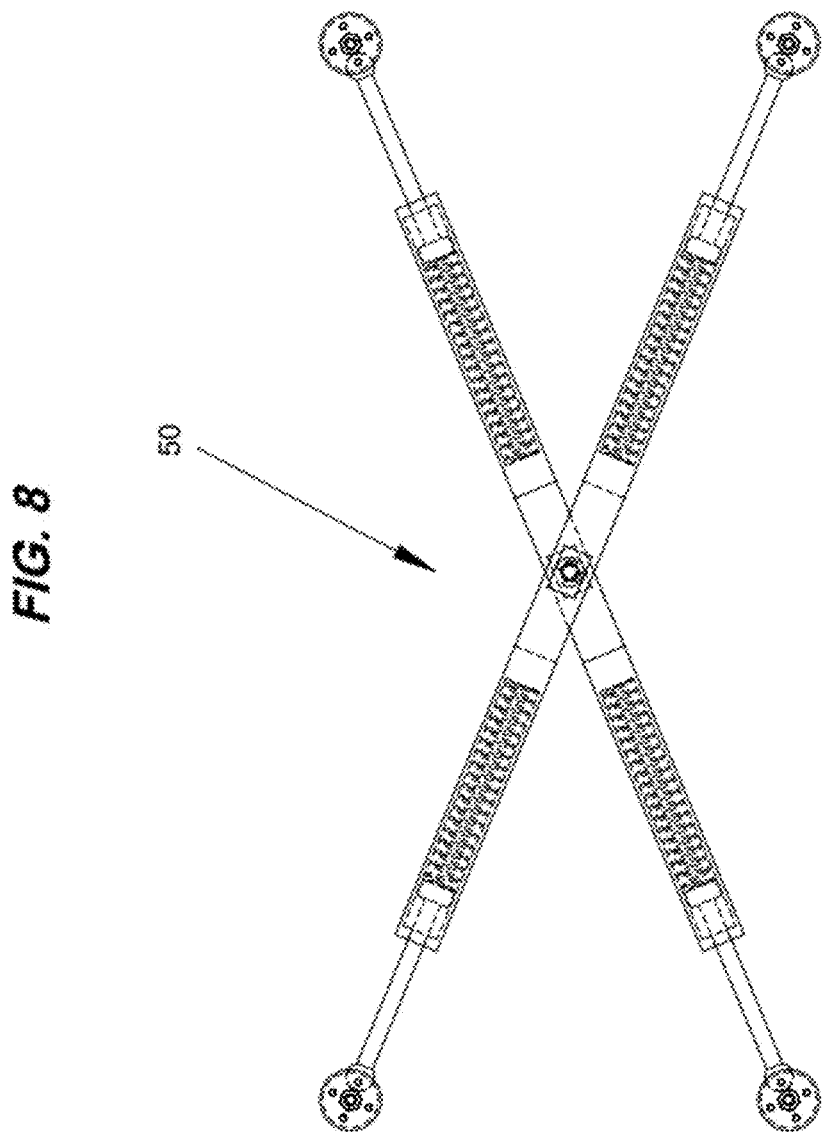
FIG. 8 is a top view of the crossed shock absorbers in the retracted position.
Figure 8A:
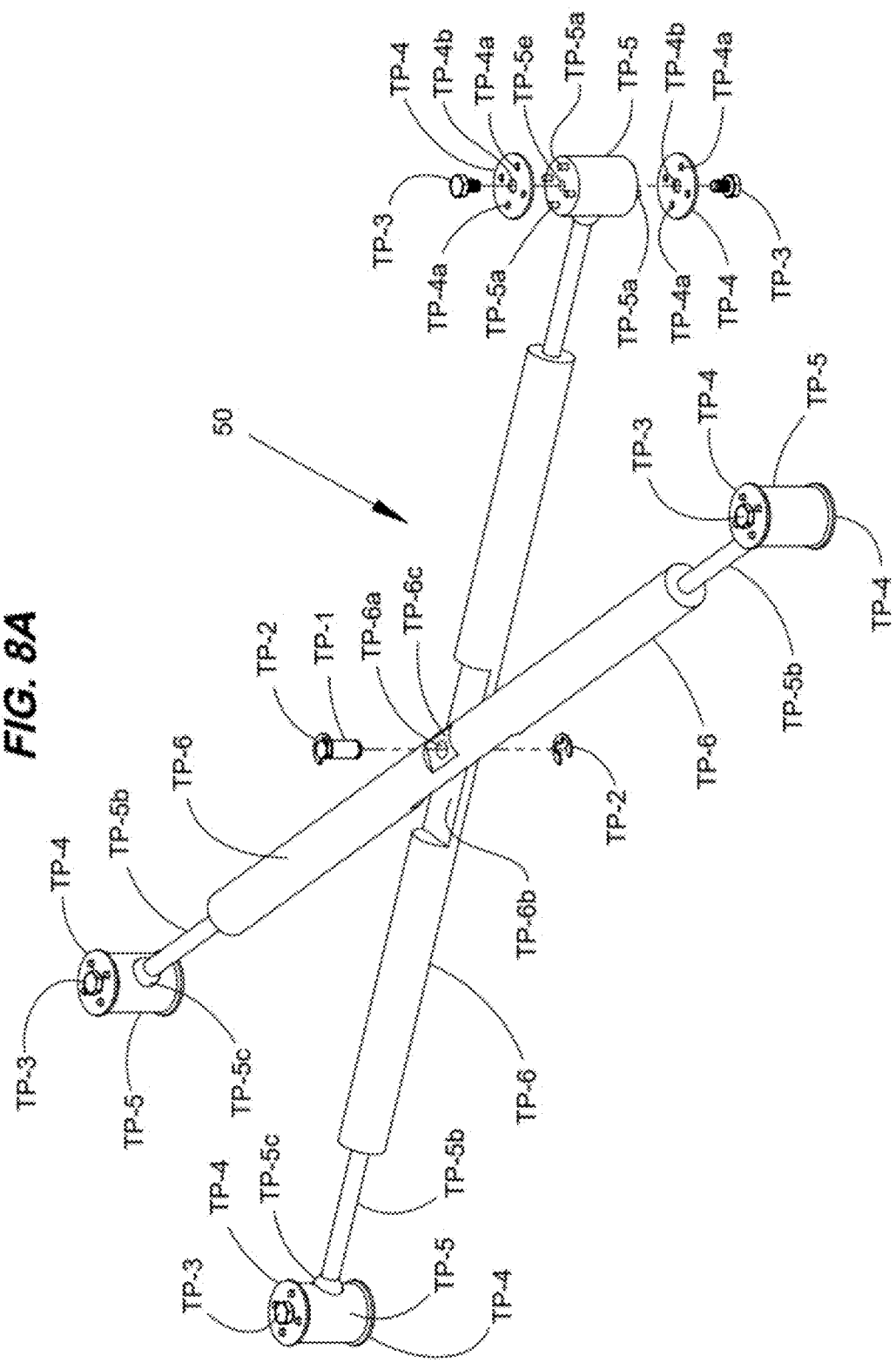
FIG. 8A is an isometric view of crossed shock absorbers with trunnions, sliding rod with ball and socket set-up, and mechanical locking features to secure overlapping parts to each other.
Figure 9:
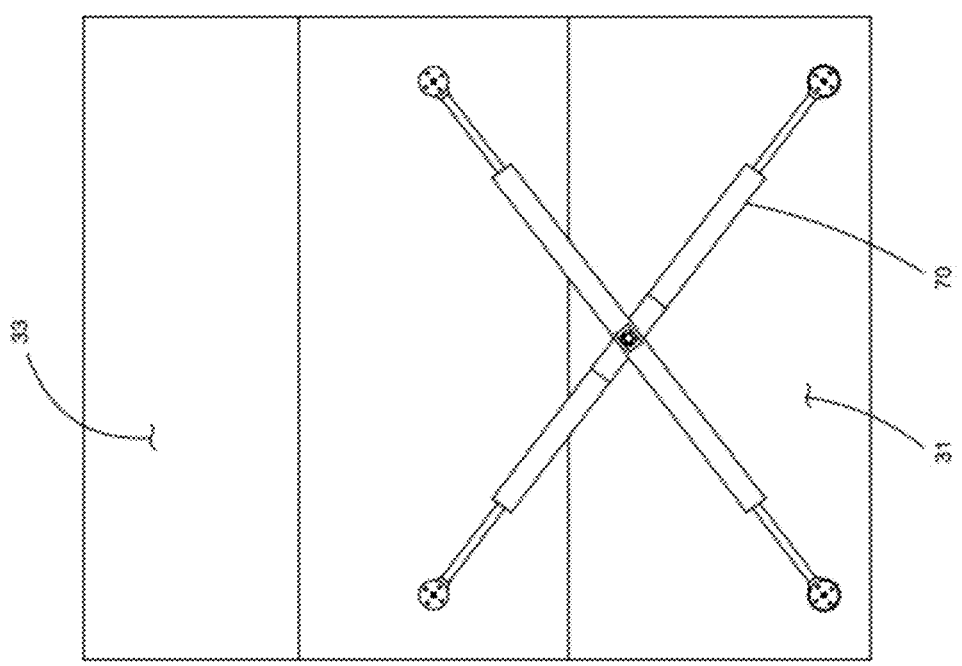
FIG. 9 is the scissor-shaped shock absorber mounted on the at least one first overlapping part in an extended position.

In a preferred embodiment, scissor shocks 50 are used with the overlapping parts to absorb the energy of impact. The shocks provide support for the overlapping parts, as shown in FIGS. 7 and 9, and when impacted, retract without crumpling or bending the overlapping parts while essentially remaining intact, as shown in FIG. 8.

As shown in FIGS. 8a to 8f, TP-6 is a cylinder housing with identical dual cavities on both ends designed to accept a sliding rod TP-5b. The shock housings cross at the center and are connected using a pivot pin TP-1 which has two snap ring grooves, one at each end. The pivot pin is threaded through TP-6a, a hole that serves as a pivot point for cylinder housing TP-6. While the pivot point is typically located at the midpoint of a cylinder housing, it can be located anywhere along the length of the housing to provide circular extension or collapsing movement of adjacent wedge-shaped triangular shaped sliding panes. TP-6b, the larger rectangular notch with a depth approximately one half the diameter of cylinder housing TP-6, provides a smooth pivoting surface between identical opposing cylinder housings and is sized to provide the range of angular movement of the shock pair while maintaining the minimum cross section height. TP-6c is a smaller rectangular notch on the opposite side of TP-6 from TP-6b, and is designed to provide a flat surface for the external snap E-ring to transfer axial loads between the pivot pin and the cylindrical shock housing.

TP-2 is the external snap ring, also known as the e-ring. It anchors the pivot pin as it nests in TP-6c. A variety of e-rings can be employed, depending on factors such as cost and axial load on the pivot pin.

At each of the four termini of the sliding rods TP-5b is a trunnion TP-5 that has a complementary socket on one side to engage spherical end of the sliding rods. The ball and socket joint is formed between the trunnion and the ball end of the sliding rod that provides support for the thrust load and angular rotational movement of the sliding rod as the scissor shock pivots about its midpoint. The trunnion also has one or more cylindrical protrusions designed to pass through matching openings on overlapping panes and engage the trunnion washer TP-4 and its complementary holes TP-4a. The cylindrical protrusions are designed to keep the trunnion from rotating on the overlapping part by providing a simple mechanical lock. Trunnion support can be injection molded from a variety of light plastics or made from carbon fibers to reduce weight.

The trunnion is assembled using a hex bolt TP-3 to mount the trunnion washer TP-4 through its center hole TP-4b. TP-4 is designed to distribute the load over a wider area and reduce localized deformation of thin plastic or metal. Complementary holes TP-4a are aligned with cylindrical protrusions or pins TP-5a which designed to mechanically lock the trunnion to overlapping parts 31 and 33. The locating holes are designed to secure the overlapping parts and prevent the trunnion from rotating.

Figure 8B:
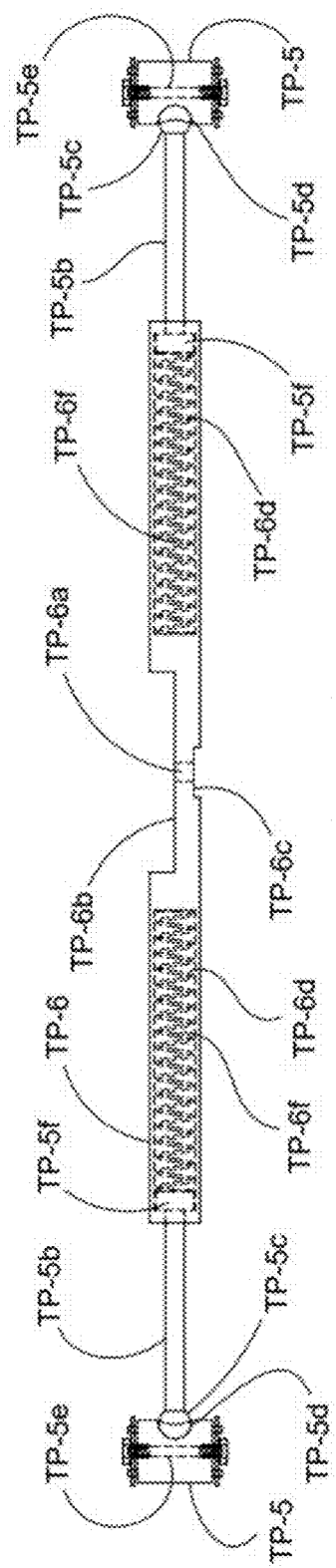
FIG. 8B is a front view of a complete shock housing with a pair of opposing trunions and sliding rods in the fully extended position.
Figure 8C:
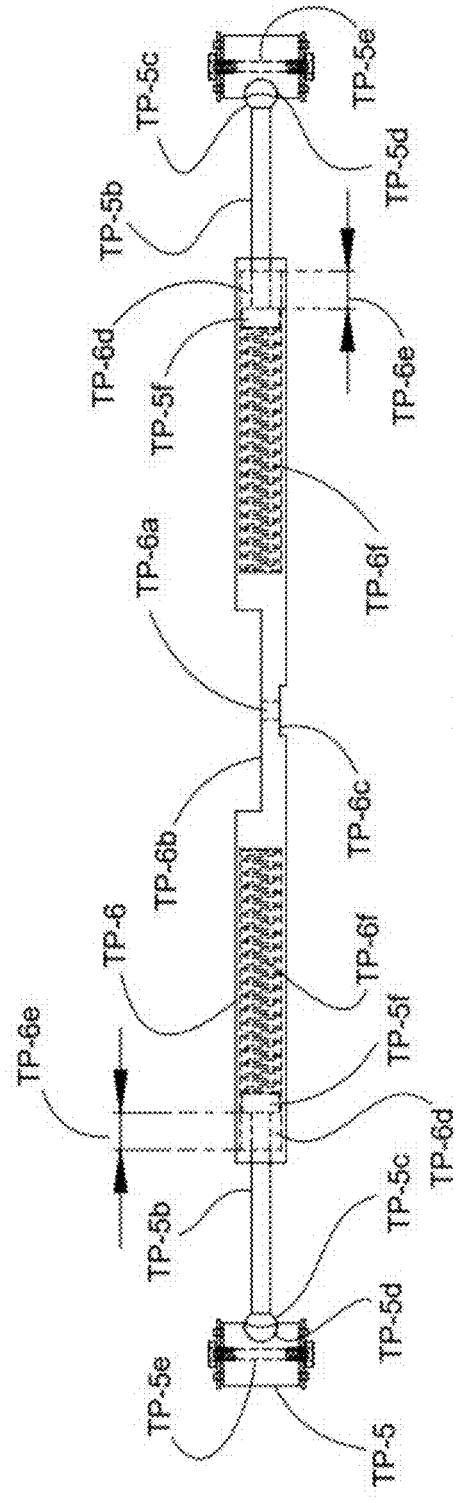
FIG. 8C is a front view of a complete shock housing with a pair of opposing trunions and sliding rods in the partially retracted position.
Figure 8D:
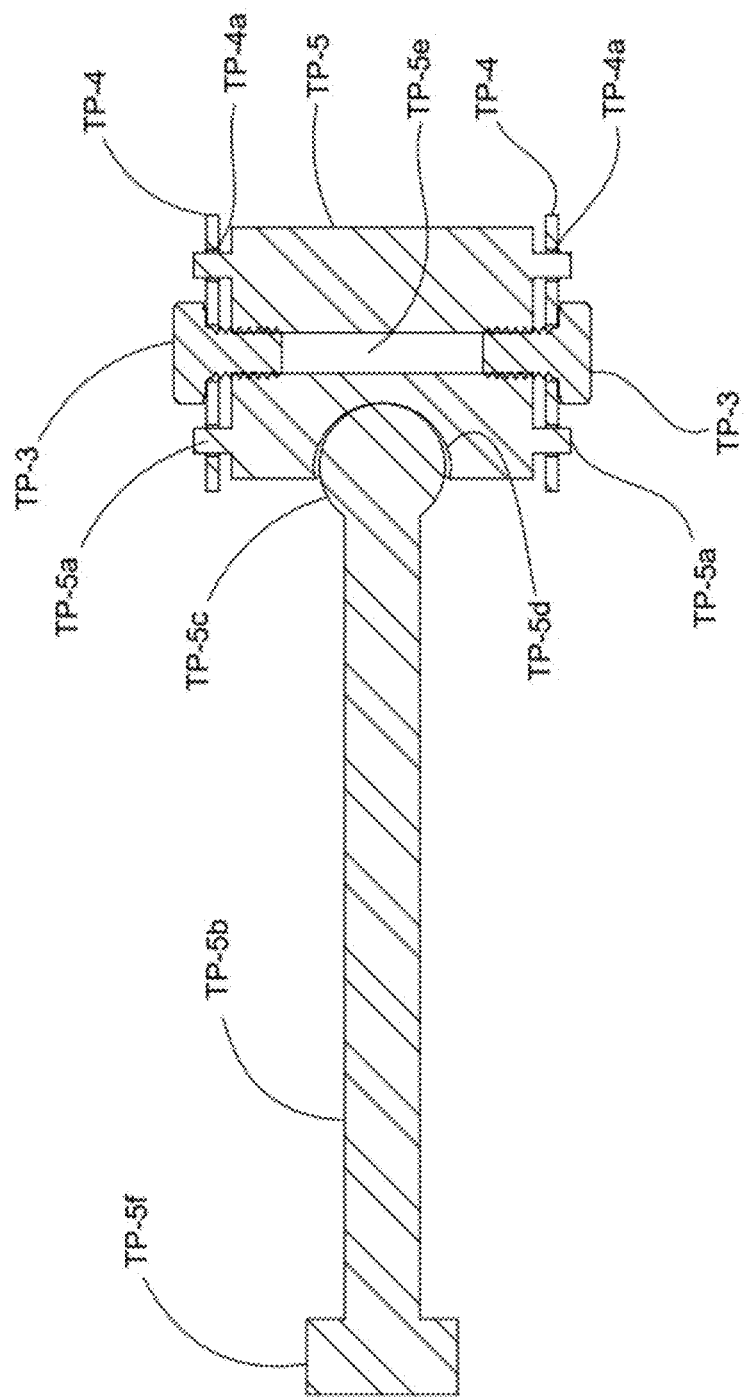
FIG. 8D is a cross-sectional view of cylindrical sliding rod TP-5$b$ and trunnion TP-5.

Referring to FIGS. 8B, 8C and 8D which are cutaway views of the scissor shock 50, the socket TP-5d or spherical cavity formed inside the trunnion supports the ball or spherical end TP-5c of the sliding rod TP-5b. The centrally located threaded portion of the trunnion TP-5e, is used to mount the trunnion washer to the overlapping part and the trunnion using the hex bolt screwed to the threaded trunnion. Mounted on the sliding rod is a piston end TP-5f at the end of each of the four cylinder housings, remote from the center of the scissor shock. Adjacent the piston end is a cylindrical cavity TP-6d inside each of the cylinder housings. Measured inside the cylinder housings is the compression travel distance TP-6e of the sliding rod TP-5b created as the overlapping part is retracted. Mounted inside the four cylinder housings is a compression spring TP-6f, designed to equalize and distribute forces equally among opposing pairs of slide rods so that when the cylinder housing is connected in an "X" or cross configuration, the overlapping parts to extend and retract parallel to each other. Compression springs can be made from common thing spring steel or plastic materials which are light weight.

FIG. 8E shows an expanded view of the trunnion mounted on overlapping part 31. On the overlapping part are peripheral locating holes 31a, which line up with cylindrical protrusions TP-5a. Central bolt access hole 31b lines up with the threaded portion of the trunion TP-5e.

Figure 8F:
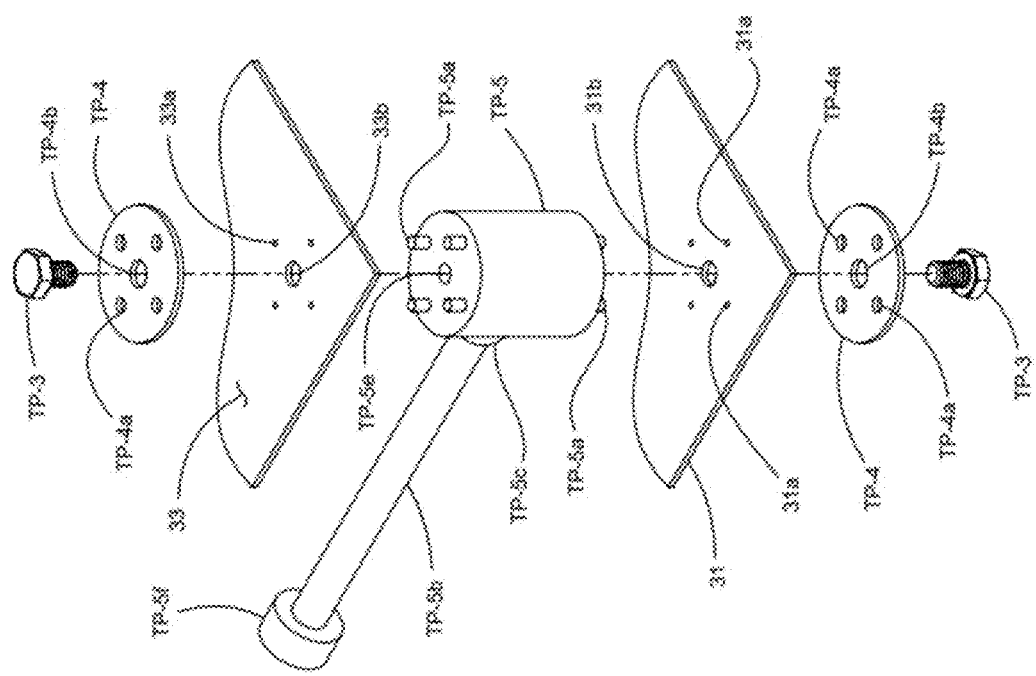
FIG. 8F is an isometric exploded view showing trunnion TP-5 being attached to a lower overlapping part 31 and upper overlapping part 33 at one corner. While the drawing shows locating four holes, we can have more or less locating holes depending on the load against the overlapping part 31 and 33 at one corner. The trunnion TP-5 and support washer TP-4 can be attached to a single overlapping part at the top or bottom or it can be attached to a pair of overlapping parts at the same time.

FIG. 8F shows an expanded view of the trunnion mounted on overlapping parts 31 and 33. On the overlapping parts are peripheral locating holes 31a and 33a, respectively, which line up with cylindrical protrusions TP-5a. Central bolt access holes 31b and 33b, respectively line up with the threaded portion of the trunion TP-5e.

Figure 10:
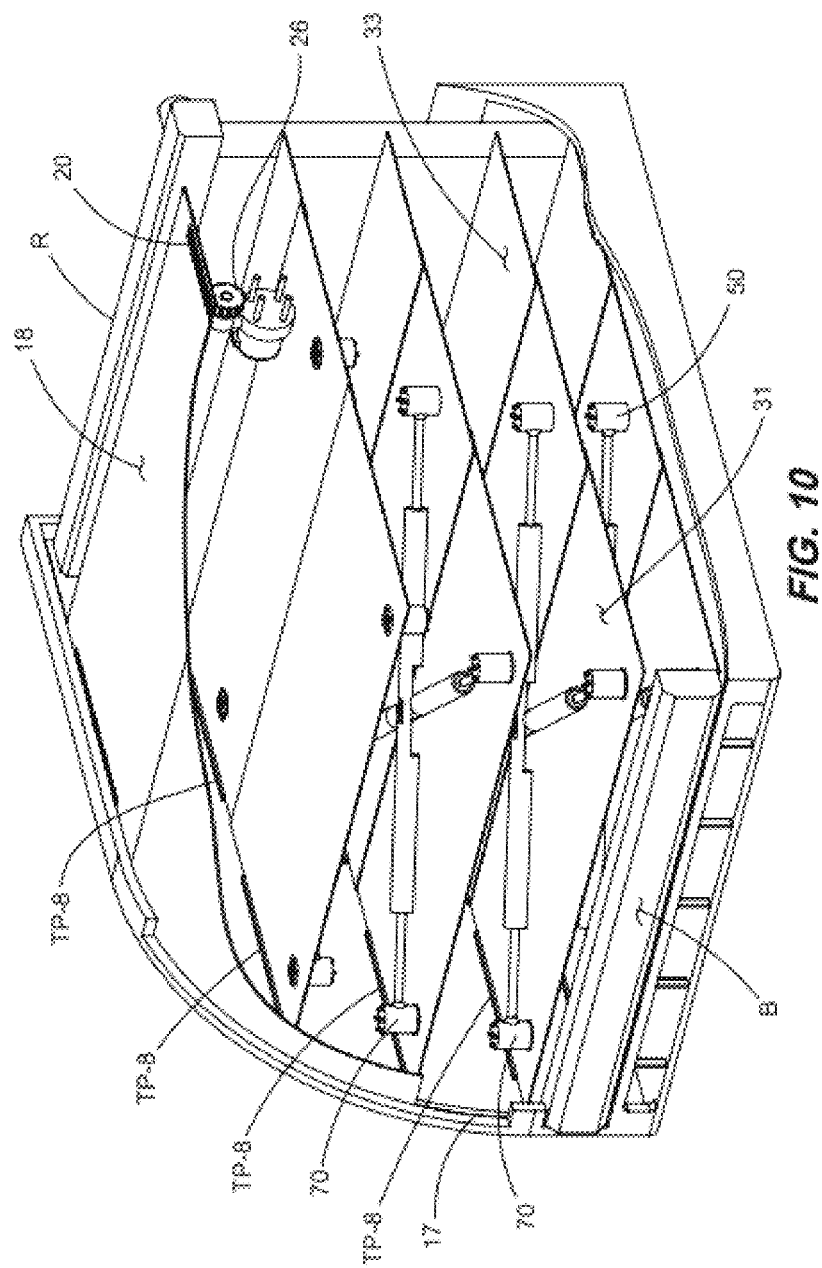
FIG. 10 is a cutaway raised perspective view of scissor-shaped shock absorbers mounted on the at least one first overlapping parts in an extended position with the cover in a partially closed position.
Figure 11:
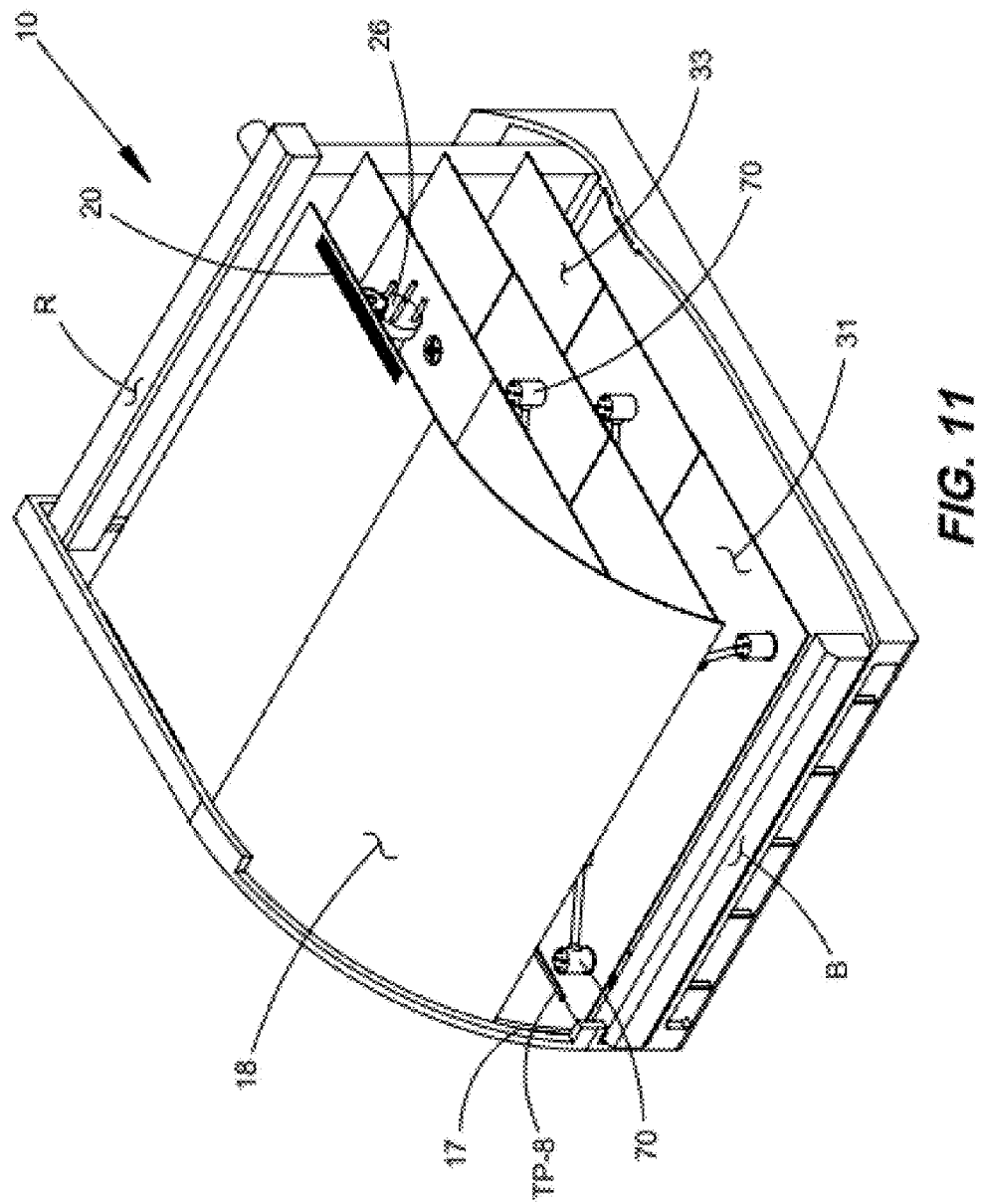
FIG. 11 is a cutaway raised perspective view of scissor-shaped shock absorbers mounted on the at least one first overlapping parts in an extended position with the cover in a partially closed position.

As shown in FIGS. 9, 10 and 11, overlapping part scissor shocks 70 can be used to connect the first overlapping part 31 and the second overlapping part 33. Alternatively, when the first overlapping part 31 has multiple overlapping parts, as shown in FIGS. 9 and 10, the scissor shocks 70 can be used to connect the multiple overlapping parts. As shown in FIGS. 10 and 11, the overlapping part scissor shocks 70 can be used with the bumper scissor shocks 50.

Figure 12:
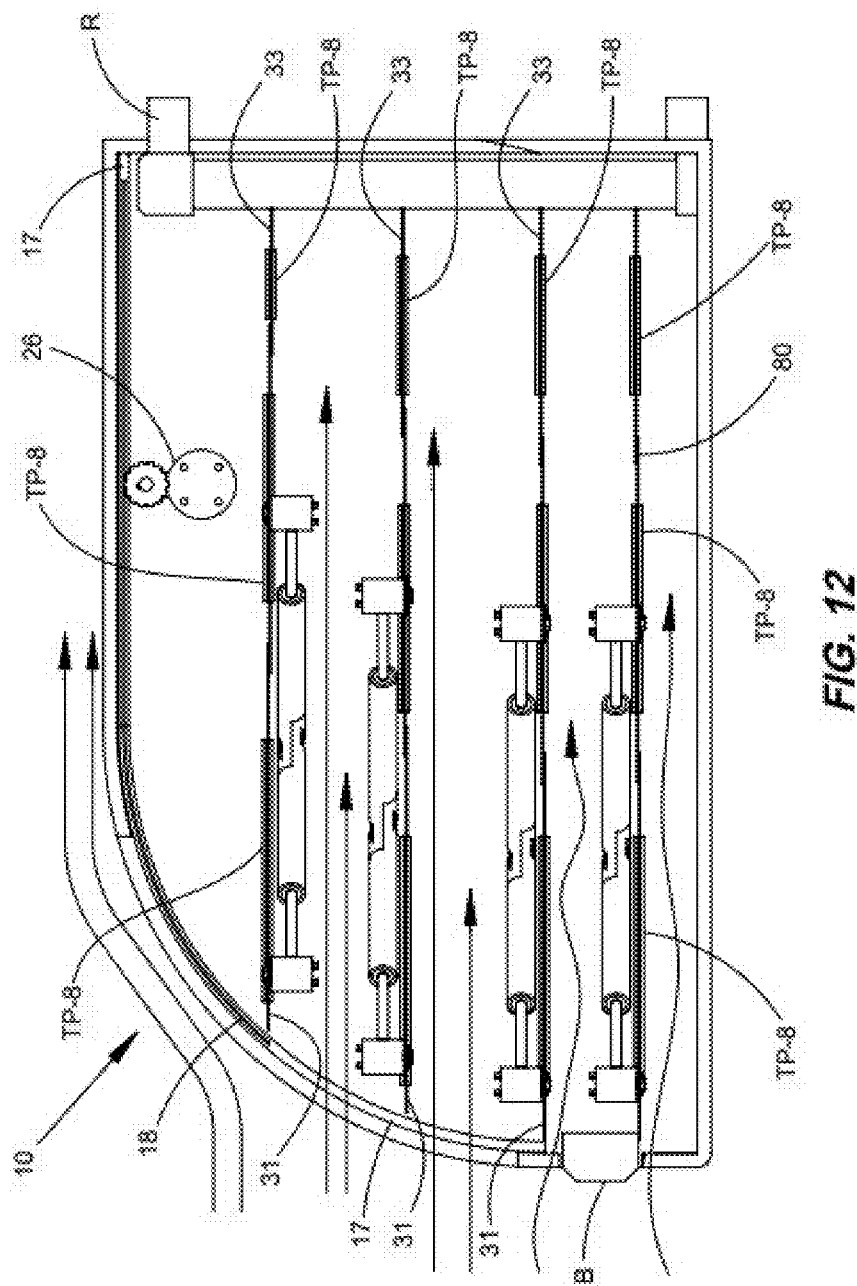
FIG. 12 is a side cutaway view of the present invention showing the air flow with the cover in an open position.
Figure 13:
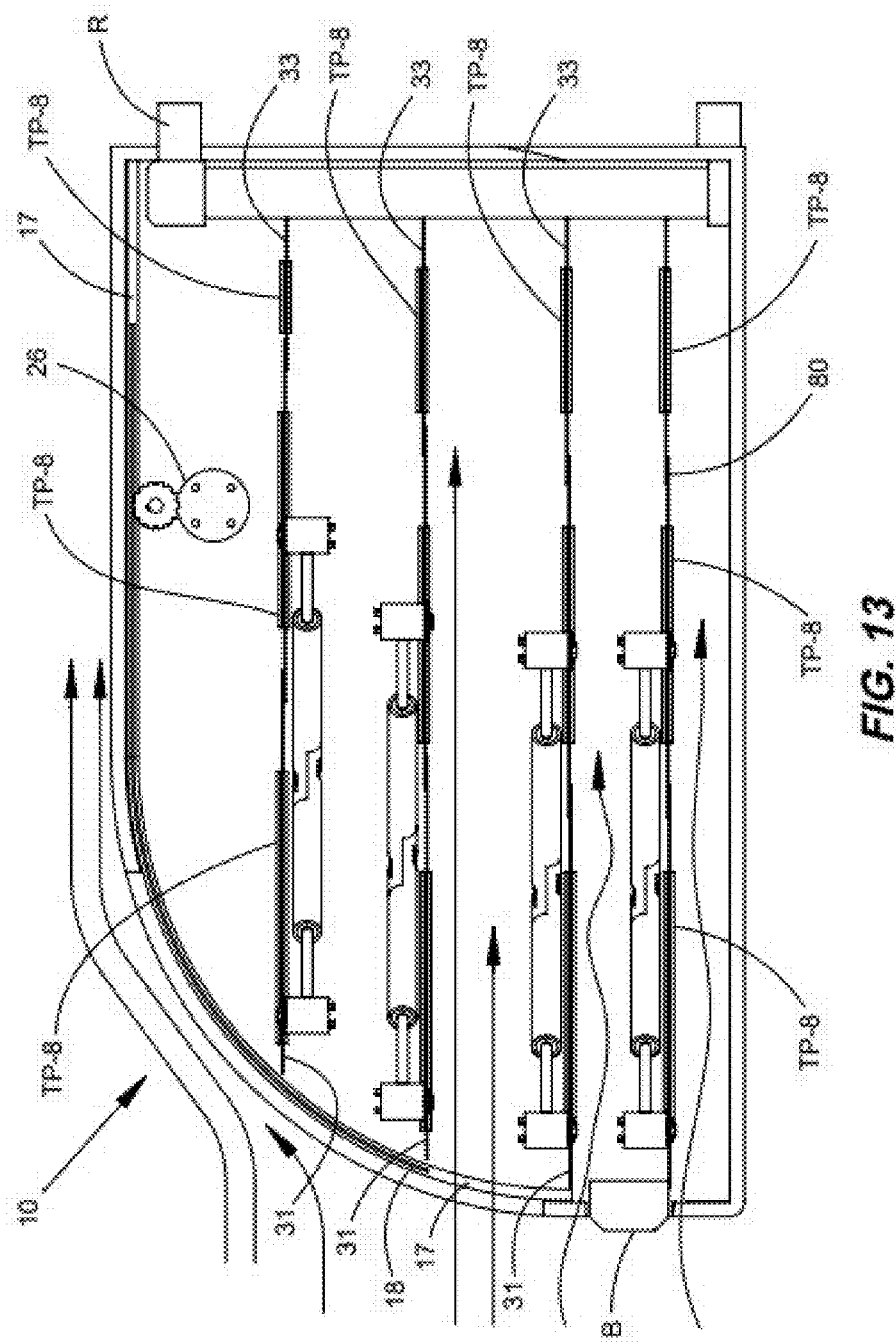
FIG. 13 is a side cutaway view of the present invention showing the air flow with the cover in a partially closed position.

As shown in FIGS. 12 and 13, closing the cover from the open position shown in FIG. 12 to the partly closed position in FIG. 13, reduces air flow, shown with arrows, to the radiator or heat exchanges R. FIGS. 12 and 13 also show that the overlapping panels 80 can be used with the bumper B as well as the panels defining the openings to the radiator. In a preferred embodiment, air flow can also come through a grill opening.

Figure 14:
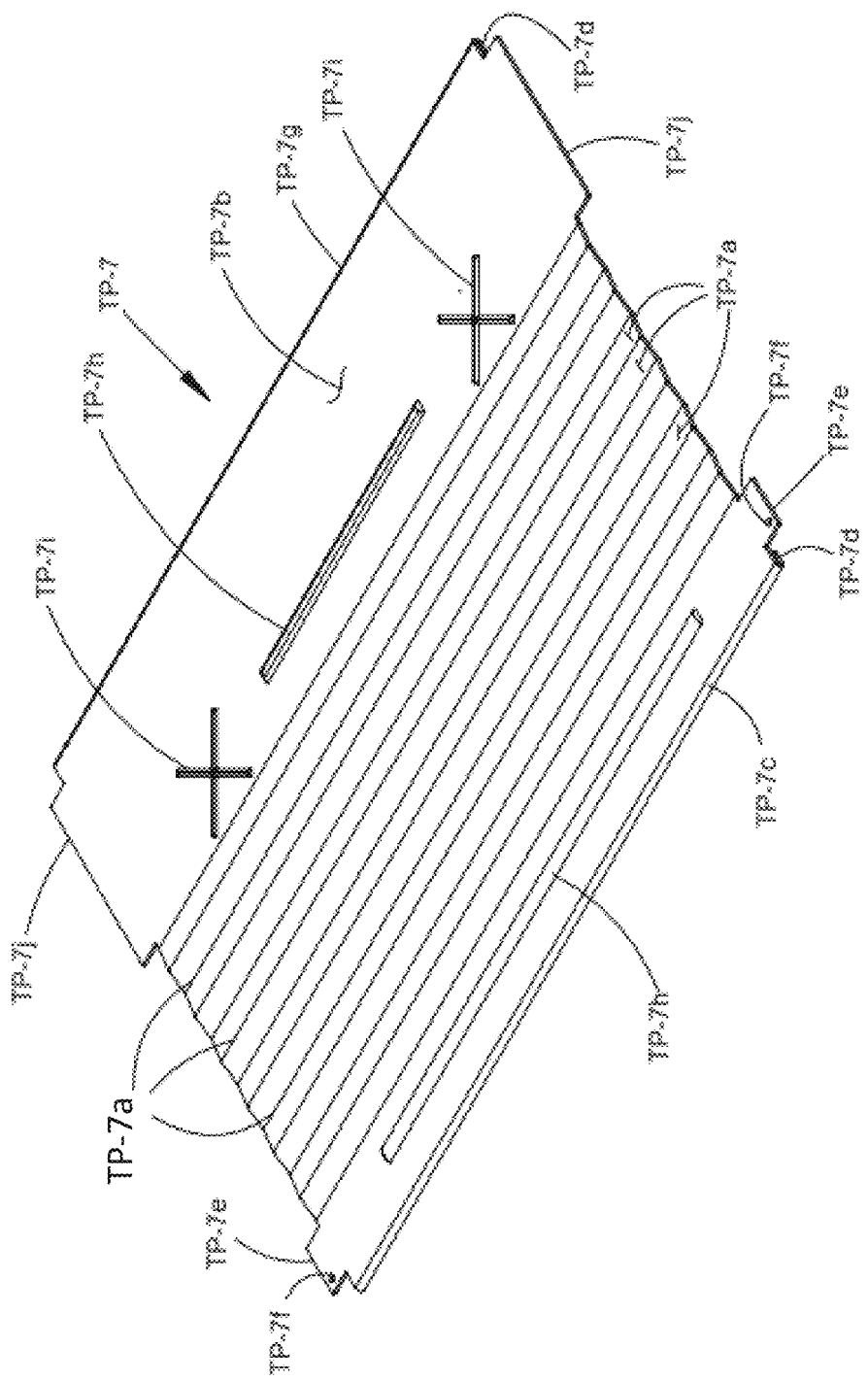
FIG. 14 is a raised perspective view of the overlapping part with pleated section TP-7$a$ near the front and the overlapping part TP-7$g$ at the rear is shown in its fully extended position.
Figure 15:
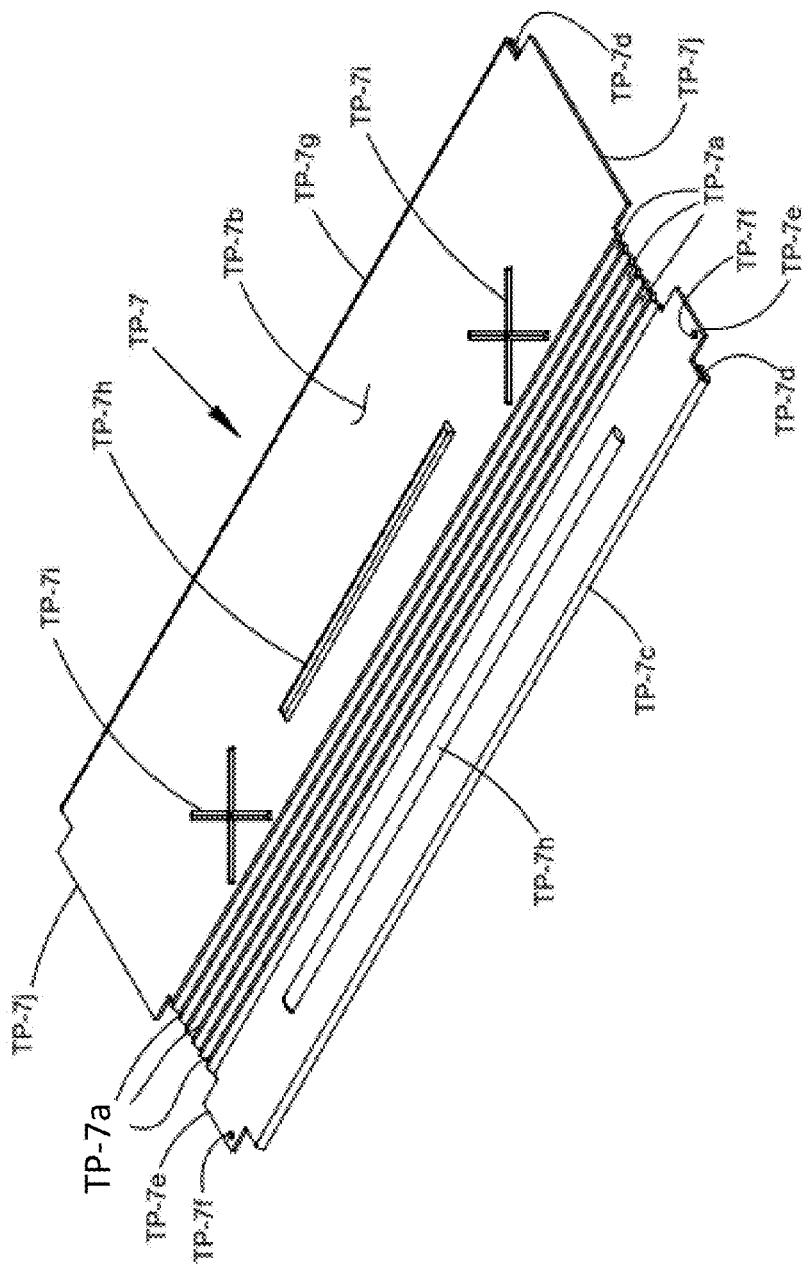
FIG. 15 is a raised perspective view of an overlapping panel with pleated section TP-7$a$ near the front and the sliding overlapping panel section TP-7$g$ at the rear is shown in the fully retracted position.

In a second embodiment, FIG. 14 shows an overlapping part TP-7 with pleated section TP-7a positioned between a rigid front leading edge TP-7c and a rear flat section TP-7b at the rear. On the rear flat section is the rear reinforced hemmed edge TP-7g. The overlapping part is shown in its fully extended position, with the pleats extended, essentially flat. Preferably, TP-7c is a reinforced, hemmed edge. In a preferred embodiment, the pleated collapsible section and the rear flat section are connected without any gaps, and optionally made from the same materials. The pleats run parallel to the front and rear reinforced edges.

Preferably, the overlapping part TP-7 is made from lightweight and flexible, and corrosion resistant to water, salt, air and oil. The materials must be stiff enough to be self-supporting. Suitable materials include mylar sheets, wax or coated papers, rubber infused fabrics with a plastic metallic wire mesh backing, plastic, or sheet metals such as aluminum, stainless steel or bronze.

In a preferred embodiment, the pleated section TP-7a is formed by scoring the flat panel material with a series of alternating top and bottom parallel lines that are approximately of equal distance from each other. This allows the collapsible section to fold in a predictable manner when impacted with sufficient force.

By varying the shape and depth of scoring, it is possible to create two or more zones of progressively increasing resistance to collapsing and can control the amount of compression displacement caused by an impact event. Additionally, by varying the width of the pleated collapsible section, it is possible to vary the amount of compression displacement by taking advantage of the stiffness of the material.

In a preferred embodiment TP-7b is designed to slide over or under another overlapping part or fixed panel 33.

As shown in FIGS. 14, 15, 16 and 17, TP-7d is a hem formed when a piece of fabric, sheet metal, or plastic material is folded over itself to provide a smooth and stiffened edge. While in FIGS. 14 and 15, the collapsible panel shows the hemmed edges folded down, one or both of the hemmed edges can be folded up to not interfere with overlapping panels as they move.

TP-7e is a front guide tab that supports and guides the front rigid portion of the overlapping pane in the track TP-8. TP-7f is a hole in the front guide tab that secures and temporarily anchors the front edge to the adjacent track guides on the vertical side segments 13c and 13d. TP-7h is a stiffening rib. Preferably, the stiffening rib has a curved cross section profile that is parallel to the front hemmed edge. TP-7i is a stiffening rib, preferably with a curved sectional in a crossed shape pattern. TP-7j is a rear guide tab that supports and guides the rear rigid portion of the overlapping panel in the track TP-8.

Figure 16:
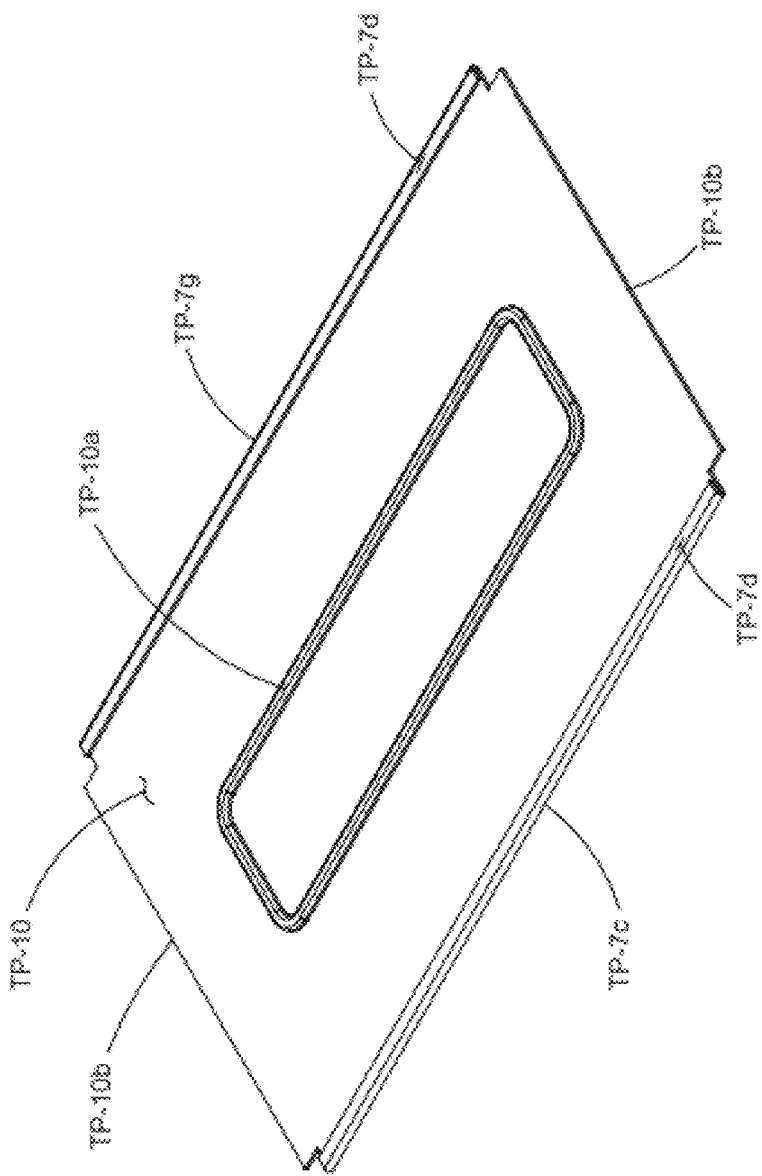
FIG. 16 is a raised perspective view of an overlapping part with front and rear hemmed edges and stiffening rib. The hems are folded up and over the top surface. The rectangular stiffening rib is shown protruding upward also.

In a preferred embodiment, as shown in FIG. 16, an overlapping part TP-10 has a front hemmed edge TP-7c and a rear hemmed edge TP-7g both turned up and over the top surface to provide a continuous smooth overlapping surface on the bottom. Preferably there is a rectangular stiffening rib TP-10a centrally located on one side. The rectangular stiffening rib is shown protruding upward also. TP-10b are guide tabs that engage the guide track TP-8

Figure 17:
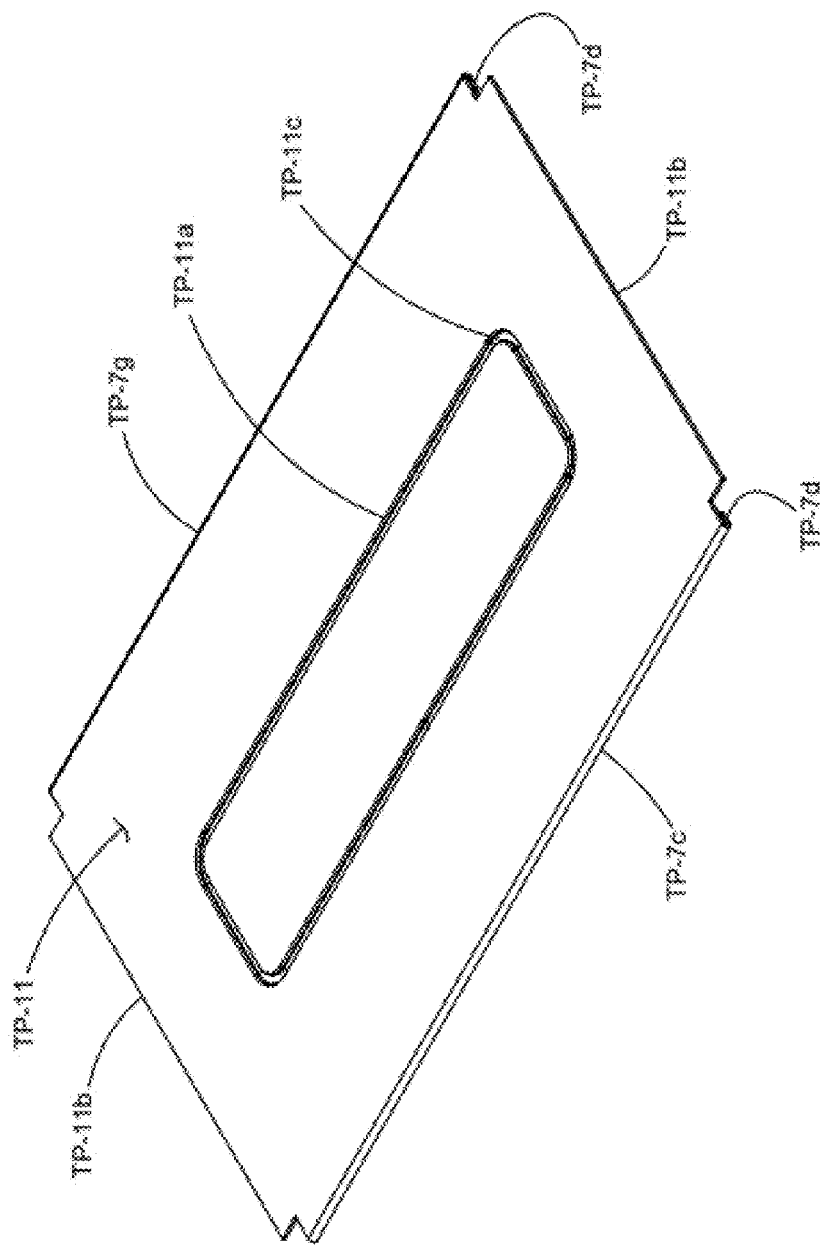
FIG. 17 is a raised perspective view of an overlapping part with front and rear hemmed edges and stiffening rib. The hems are folded down and under the bottom surface. The rectangular stiffening rib is shown protruding downward also.

In a preferred embodiment, as shown in FIG. 17, an overlapping part TP-11 has a front hemmed edge TP-7c, a rear hemmed edge TP-7g, and a rectangular stiffening rib TP-11a. The hems are folded down and under the bottom surface. The rectangular stiffening rib is shown protruding downward also. TP-11b are guide tabs to engage with guide track TP-8. TP-11c is the bottom groove of stiffening rib TP-11a. The hemmed edges are turned down and over the bottom to provide a continuous smooth surface that can lap over with TP-10 and move as they overlap.

Figure 18B:
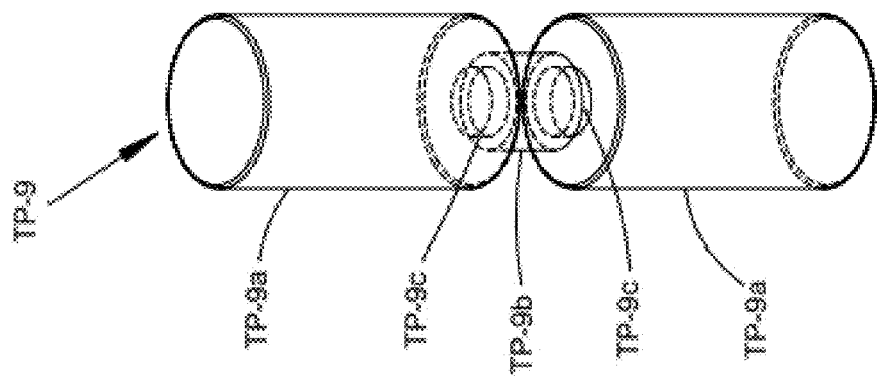
FIG. 18B is a raised perspective view of the shear pin TP-9, which is designed to fail in shear mode by breaking off in the middle at notched section TP-9$c$.
Figure 18A:
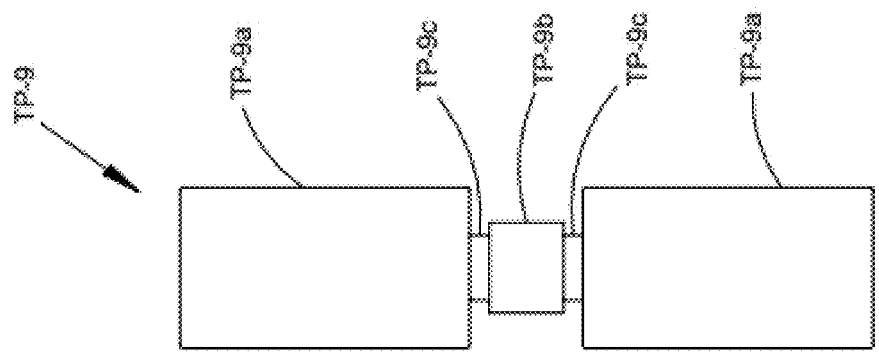
FIG. 18A is a front view of the shear pin TP-9, which is designed to fail in shear mode by breaking off in the middle at notched section TP-9$c$.

FIGS. 18a and 18b show the shear pin TP-9, which is designed to fail in shear mode by breaking off in the middle at notched section TP-9c. TP-9 is a disposable shear pin designed to fail or to break in half when a shear force exceeds a yield limit. Typically the shear pin is in the shape of an hour glass and will have a substantially thinner section TP-9b nestled between two thicker sections TP-9a. TP-9c is the notched portion that fails when impacted, as the middle thinner section is designed to fail first. When an object impacts the overlapping part's front hemmed edge with sufficient force above the combined yield strength of both shear pins, the two shear pins will break and allow the front hemmed edge to slide rearward and transfer the impact forces to the collapsible section. It is important to note that overlapping part TP-7 is moving rearward and transferring some of the impact forces to the next overlapping pane in a controlled cascade rearward.

Figure 19:
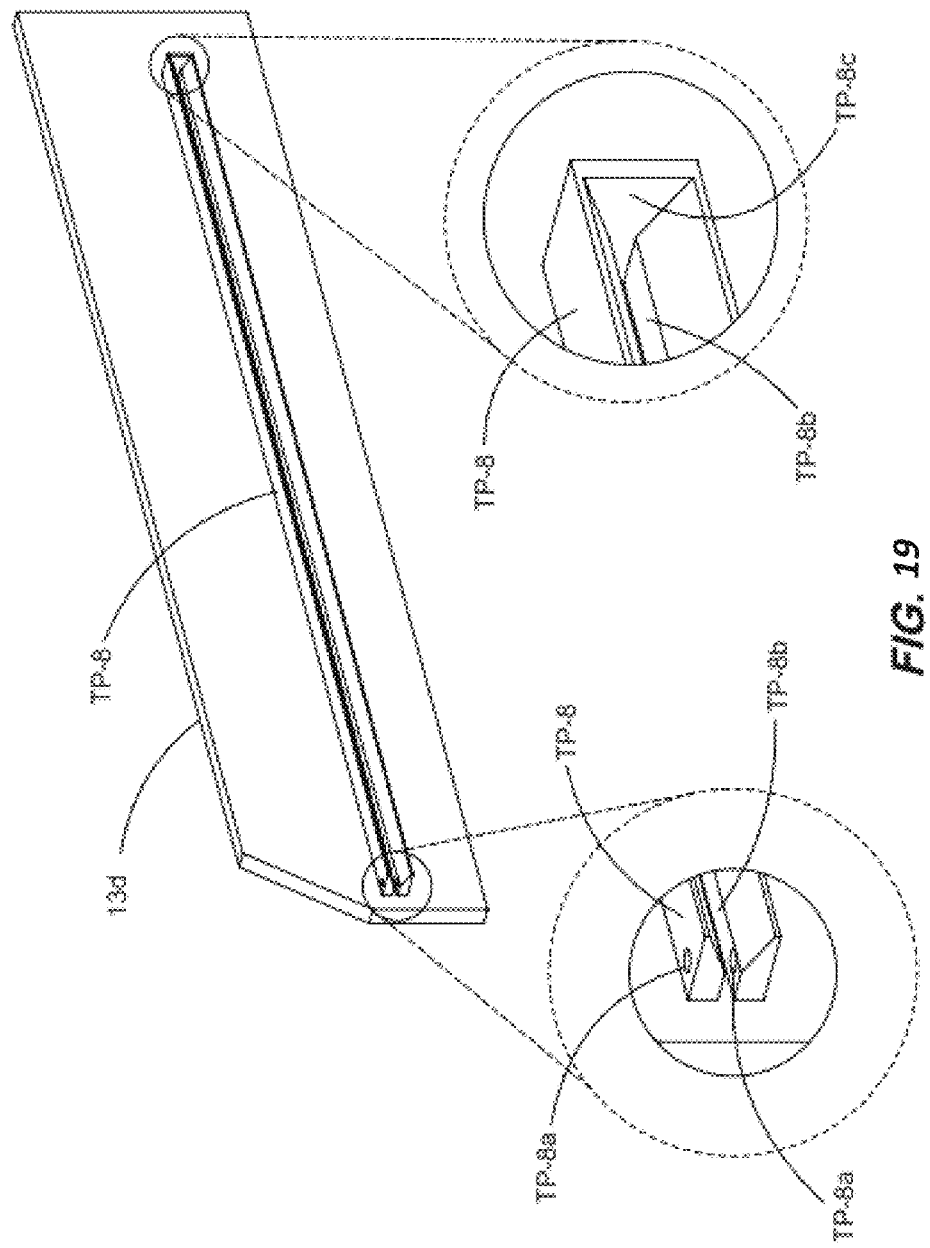
FIG. 19 is a raised perspective view of U-channel guide TP-8 formed into a portion of the inner wall of each vertical side segment 13$c$ and 13$d$.

FIG. 19 shows a U-channel guide TP-8 formed into a portion of the inner wall of each vertical side segment 13c and 13d to capture the outer margins of overlapping parts 31 and 33. TP-8a is a hole on the U-channel to engage the shear pin TP-9. TP-8b is the groove formed on the U-channel and is used to engage overlapping parts 31 and 33. TP-8c is the rear stop of the channel.

Figure 20:
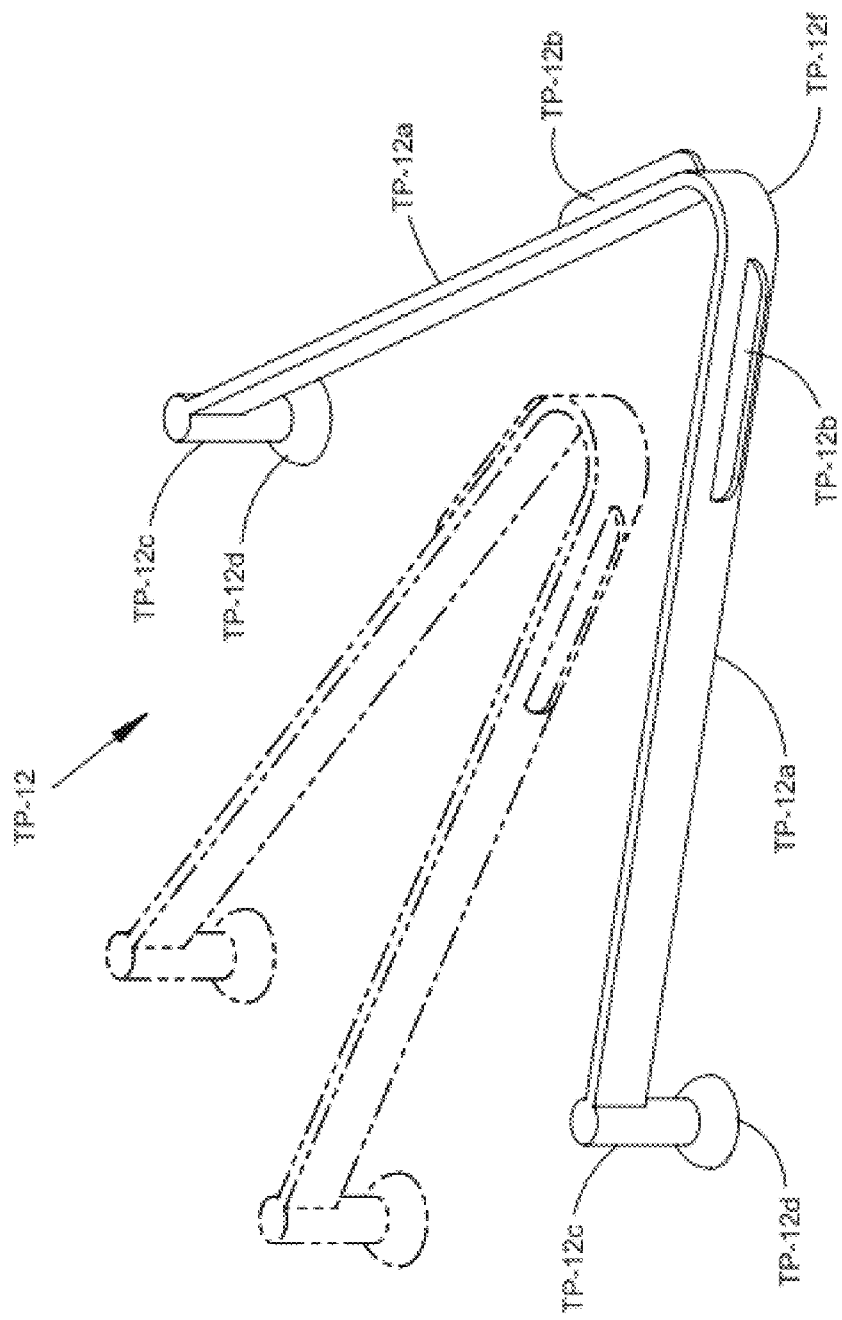
FIG. 20 is a perspective view of a V-spring in its fully expanded and compressed positions.

FIG. 20 shows a V-spring in its fully expanded and compressed positions. This V-spring design is similar to a salad tong, which is formed from a single band of bent metal. The V-spring has two long arms TP-12a that share a common fulcrum TP-12f, stamped from the same metal or injection molded from a variety of engineered plastic metals. These tongs often employ a torsion spring to return the tong from its tensioned position to its relaxed and expanded position. Optionally, the V-spring has a stiffening rib TP-12b. To mount the V-spring to a surface, a spring column base TP-12d is used. Optionally, the base can be attached to the V-spring using a support column TP-12c. V-springs can be attached to overlapping parts using a variety of mechanical fasteners such as screws and rivets.

Figure 21:
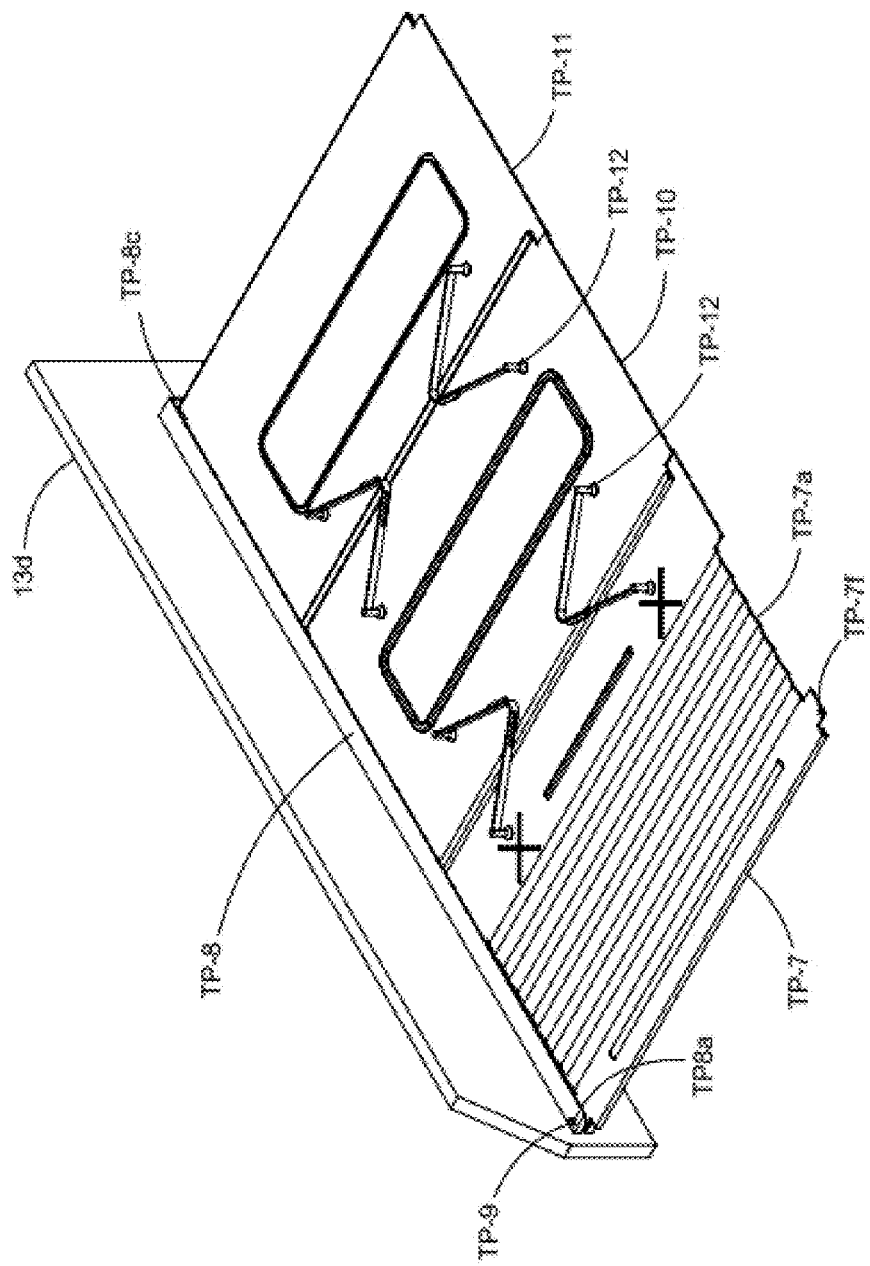
FIG. 21 is a perspective view of the overlapping part in the fully extended position.

FIG. 21 is an assembly of overlapping parts TP-7, TP-10 and TP 11 held retractably by V-spring TP-12 and engaged with guide TP-8. The assembly is in the relaxed, uncollapsed, and extended position. At the front is TP-7 having the collapsible pleated section TP-7a. The pleated section is narrower than TP7e and TP7j, which engage with guide TP-8. That is because when in the retracted position, the pleats will push together and rise up. If the pleated section was engaged with the guide, that would not happen, and the pleated section would not collapse. The overlapping part TP-7 is secured to guide TP-8 with shear pins TP-9 through holes TP-7f and TP-8a. Adjacent to TP-7 is TP-10, whose front edge TP-7c laps over the rear edge TP-7g of TP-7. Adjacent to TP-10 is TP-11, whose front edge TP-7c laps under the rear edge TP-7g of TP-10. The three panels are held in position by V-springs TP-12 in the relaxed position.

Figure 22:
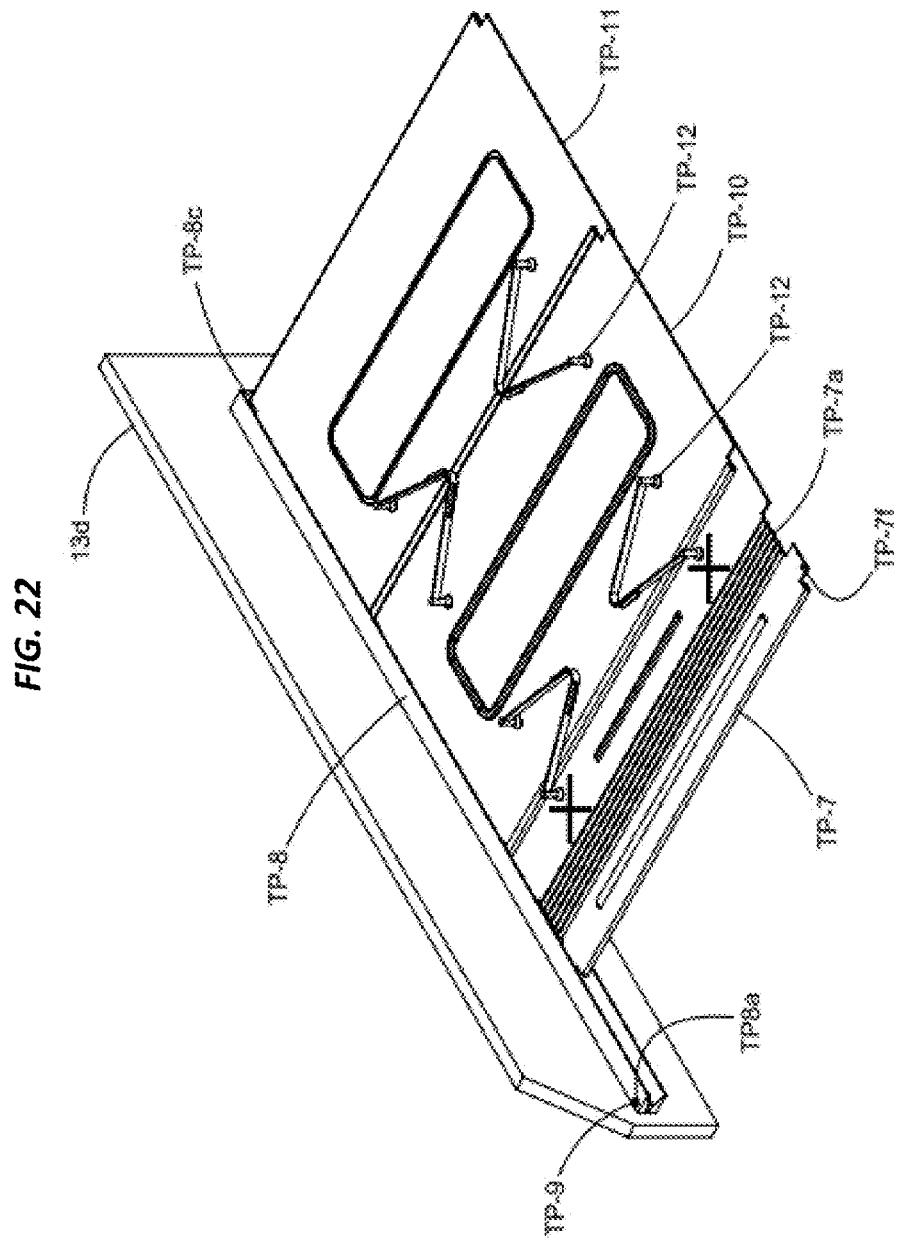
FIG. 22 is a perspective view of the overlapping part in the fully retracted position.

FIG. 22 shows the assembly of FIG. 21 in the collapsed, retracted position. The pleated section of TP-7a is compressed and the V-spring TP-12 connected to TP-7 and TP-10 is on the compressed position. The rear edge of TP-7 has lapped under the front edge of TP-10. The front edge of TP-7 has moved backward along the guide TP-8.

Figure 23:
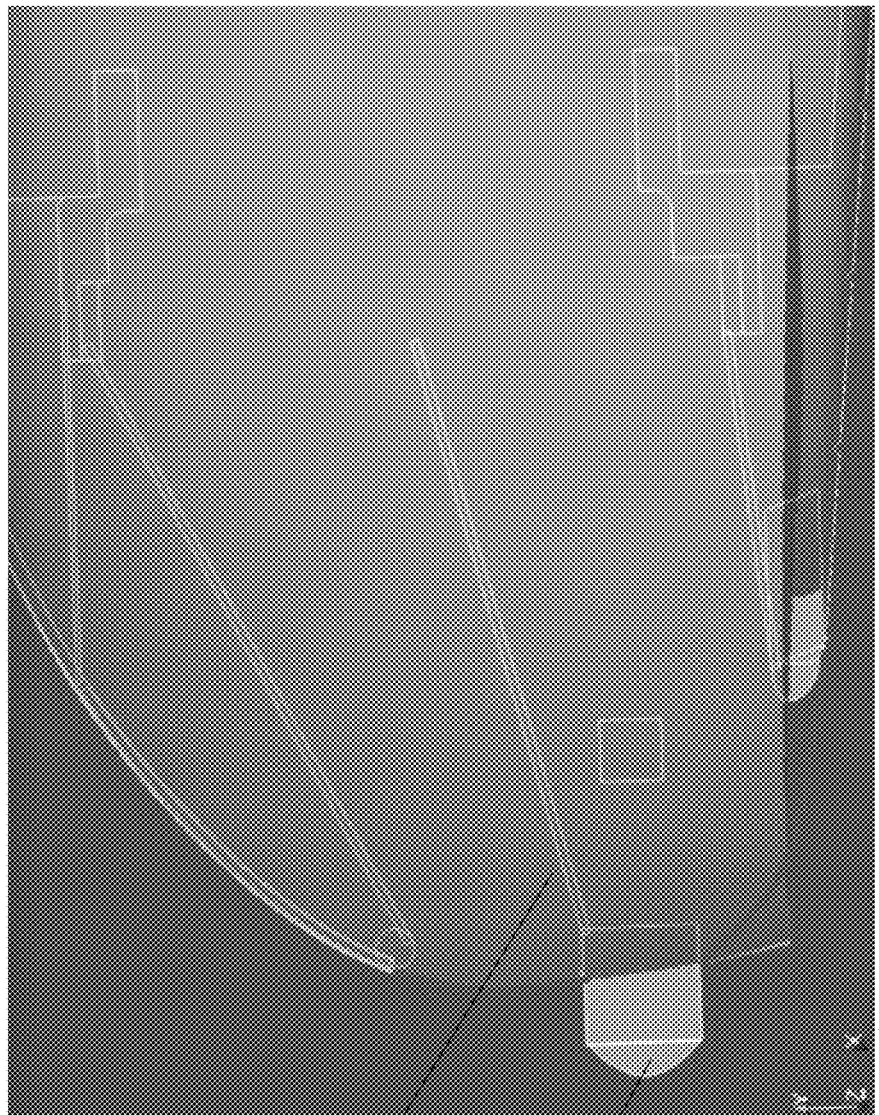
FIG. 23 is a side cut-away view of the panels slanted upward from the engine toward the bumper.

FIG. 23 shows the panels in an upward slant going from the front bumper B area toward the engine. This upward slant provides improved performance and reduced wind resistance.

The embodiments were chosen and described to best explain the principles of the invention and its practical application to persons who are skilled in the art. As various modifications could be made to the exemplary embodiments, as described above with reference to the corresponding illustrations, without departing from the scope of the invention, it is intended that all matter contained in the foregoing description and shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A fairing assembly installed about a heat exchanger of a vehicle to promote efficient air flow over and about the front of the vehicle and reduce the drag on the vehicle, comprising:
    a frame installed about the heat exchanger and defining an opening through which air flows into the heat exchanger, the frame having a curved contour which allows air to flow smoothly about the frame;
    a panel comprising at least one overlapping park mounted in the frame and extending across the front of the heat exchanger;
    wherein the panel and fairing assembly defining an air passage for air flow to the heat exchanger;
    a cover installed in the frame and movable over the front of the heat exchanger to control air flow through the passage to the heat exchanger; and
    moving means for moving the cover over the frame to expose a portion of the opening and allow air to flow into the heat exchanger;
    wherein the frame and cover producing a smoother flow of air over and about the front of the vehicle thereby reducing the amount of drag on the vehicle while still allowing air flow into the heat exchanger;
    wherein the overlapping panel comprises a first overlapping part and a second overlapping part; and
    wherein the first overlapping part is moveable from the force of an impact from an extended position to a retracted position, and the second overlapping part is fixed.

2. The fairing assembly of claim 1 further including a plurality of overlapping panels mounted in the frame at spaced intervals so to define a plurality of air flow passages to the heat exchanger.

3. The fairing assembly of claim 1 in which the vehicle has a combustion engine with a radiator as heat exchanger.

4. The fairing assembly of claim 1 in which the vehicle has an electric motor with a heat exchanger.

5. The fairing assembly of claim 1 further wherein the overlapping panel further includes at least one spring mechanism attached to the first overlapping part to absorb the force from an impact.

6. The fairing assembly of claim 1 wherein the overlapping panel further includes at least one spring mechanism attached to the first overlapping part and the second overlapping part to absorb the force from an impact.

7. The fairing assembly of claim 5 in which the vehicle has a bumper;
    wherein the bumper is collapsible; and
    wherein the bumper is mounted on a spring mechanism to absorb the force of an impact.

8. The fairing assembly of claim 7 in which the vehicle has a bumper;
    wherein the bumper is mounted on overlapping panels to absorb the force of an impact.

9. A vehicle comprising a fairing assembly installed about a heat exchanger of the vehicle to promote efficient air flow over and about the front of the vehicle and reduce the drag on the vehicle, comprising:
    a frame installed about the heat exchanger and defining an opening through which air flows into the heat exchanger, the frame having a curved contour which allows air to flow smoothly about the frame;
    a panel comprising at least one first overlapping part and at least one second overlapping part mounted in the frame and extending across the front of the heat exchanger;
    wherein the panel and fairing assembly defining an air passage for air flow to the heat exchanger;
    a cover installed in the frame and movable over the front of the heat exchanger to control air flow through the passage to the heat exchanger; and
    moving means for moving the cover over the frame to expose a portion of the opening and allow air to flow into the heat exchanger;

wherein the frame and cover producing a smoother flow of air over and about the front of the vehicle thereby reducing the amount of drag on the vehicle while still allowing air flow into the heat exchanger;

wherein the panel comprises at least one first overlapping part and at least one second overlapping part;

wherein at least one spring mechanism is used to attach the at least one first overlapping part to another at least one first overlapping part or to the at least one second overlapping part, or to both the at least one first and second overlapping parts;

wherein the at least one first overlapping part is moveable from the force of an impact from an extended position to a retracted position, and the at least one second overlapping part is fixed;

wherein with the force of the impact, the spring mechanism goes from a relaxed state in the extended position to a tensioned state in the retracted position; and wherein when the force of the impact is removed, the spring mechanism goes back to the relaxed state in the extended position.

10. The vehicle of claim 9 further including a plurality of panels mounted in the frame at spaced intervals so to define a plurality of air flow passages to the heat exchanger.

11. The vehicle of claim 10 in which the vehicle has a combustion engine with a radiator as heat exchanger.

12. The vehicle of claim 11 in which the vehicle has an electric motor with a heat exchanger.

13. The vehicle of claim 12 further wherein the spring mechanism is selected from the group consisting of scissor shocks, V-springs, coil springs, torsion springs, and helical springs.

14. The vehicle of claim 13 wherein the overlapping panel further includes scissor shocks attached to the first overlapping part and the second overlapping part to absorb the force from an impact.

15. The vehicle of claim 14, wherein the at least one first overlapping part has at least one pleated section.

16. The vehicle of claim 15, wherein the at least one first overlapping part has at least one pleated section and a flat section.

17. The vehicle of claim 16, wherein the at least one first overlapping part and the at least one second overlapping part are each connected by two spring mechanisms.

18. The vehicle of claim 17, wherein the spring mechanisms are selected from the group consisting of V-springs and scissor shocks.

19. A vehicle comprising a fairing assembly installed about a heat exchanger of the vehicle to promote efficient air flow over and about the front of the vehicle and reduce the drag on the vehicle, comprising:

a frame installed about the heat exchanger and defining an opening through which air flows into the heat exchanger, the frame having a curved contour which allows air to flow smoothly about the frame;

a plurality of panels comprising at least one first overlapping part and at least one second overlapping part mounted in the frame and extending across the front of the heat exchanger;

wherein the at least one first overlapping part is moveable from the force of an impact from an extended position to a retracted position, and the at least one second overlapping part is fixed;

wherein the at least one first overlapping part has a pleated section;

wherein the plurality of panels are mounted in the frame at spaced intervals so to define a plurality of air flow passages to the heat exchanger wherein the plurality of panels and fairing assembly defining a plurality of air passages for air flow to the heat exchanger;

a cover installed in the frame and movable over the front of the heat exchanger to control air flow through the passages to the heat exchanger; and moving means for moving the cover over the frame to expose a portion of the opening and allow air to flow into the heat exchanger;

wherein the frame and cover producing a smoother flow of air over and about the front of the vehicle thereby reducing the amount of drag on the vehicle while still allowing air flow into the heat exchanger;

wherein at least one spring mechanism is used to attach the at least one first overlapping part to another at least one first overlapping part, or to the at least one second overlapping part, or to both the at least one first and second overlapping parts;

wherein with the force of the impact, the spring mechanism goes from a relaxed state in the extended position to a tensioned state in the retracted position; and wherein when the force of the impact is removed, the spring mechanism goes back to the relaxed state in the extended position.

20. The vehicle of claim 19, wherein the at least one overlapping parts have a pleated section and a flat section; and wherein each of the at least one first overlapping parts and the at least one second overlapping parts are attached by two spring mechanisms.

* * * * *